US012691355B2

(12) United States Patent
Jacobs, II et al.

(10) Patent No.: US 12,691,355 B2
(45) Date of Patent: Jul. 28, 2026

(54) FITNESS CLASSROOM ASSEMBLY AND A METHOD OF USE

(71) Applicant: Anytime Movement LLC, Nashua, NH (US)

(72) Inventors: James L. Jacobs, II, Nashua, NH (US); Jonas Amberger, Eliot, ME (US)

(73) Assignee: Anytime Movement LLC, Nashua, NH (US)

( * ) Notice: Subject to any disclaimer, the term of this patent is extended or adjusted under 35 U.S.C. 154(b) by 0 days.

(21) Appl. No.: 18/779,251

(22) Filed: Jul. 22, 2024

(65) Prior Publication Data

US 2025/0090933 A1     Mar. 20, 2025

Related U.S. Application Data

(63) Continuation of application No. 18/369,023, filed on Sep. 15, 2023, now Pat. No. 12,145,047.

(51) Int. Cl.
| | |
|---|---|
| *A63B 71/06* | (2006.01) |
| *A63B 24/00* | (2006.01) |
| *G06F 3/14* | (2006.01) |
| *G09B 5/06* | (2006.01) |
| *G09B 19/00* | (2006.01) |

(52) U.S. Cl.
CPC ...... *A63B 71/0622* (2013.01); *A63B 24/0062* (2013.01); *G06F 3/1423* (2013.01); *G09B 5/06* (2013.01); *G09B 19/003* (2013.01); *A63B 2071/0638* (2013.01); *A63B 2220/05* (2013.01)

(58) Field of Classification Search
CPC ........ G09B 5/06; G09B 5/065; G09B 19/003; A63B 24/0062; A63B 71/0622
See application file for complete search history.

(56) References Cited

U.S. PATENT DOCUMENTS

| | | |
|---|---|---|
| 6,902,513 B1 | 6/2005 | McClure |
| 2009/0011907 A1 | 1/2009 | Radow et al. |
| 2010/0022351 A1 | 1/2010 | Lanfermann et al. |
| 2016/0089574 A1 | 3/2016 | Henning et al. |
| 2016/0325145 A1 | 11/2016 | Pinkerton |
| 2019/0118066 A1 | 4/2019 | Cardona et al. |
| 2019/0184234 A1 | 6/2019 | Packles et al. |
| 2020/0302181 A1 | 9/2020 | Bhanu et al. |

(Continued)

FOREIGN PATENT DOCUMENTS

CN          105944332 B      12/2018

OTHER PUBLICATIONS

US 11,007,418 B2, 05/2021, Putnam (withdrawn)

*Primary Examiner* — Peter R Egloff

(74) *Attorney, Agent, or Firm* — Caldwell LLC

(57) ABSTRACT

A fitness classroom assembly and a method of use are disclosed. The fitness classroom assembly includes a fitness classroom, wherein the fitness classroom includes a first display and a second display. The fitness classroom includes at least a processor and a memory communicatively connected to the at least processor. The memory includes instructions configuring the at least processor to receive primary class content data including a primary video display data and secondary class content data including secondary video display data, display the primary video display data on the first display to a user and display the secondary video display data on the second display to the user.

22 Claims, 9 Drawing Sheets

(56)            References Cited

U.S. PATENT DOCUMENTS

| | | | |
|---|---|---|---|
| 2021/0312689 A1* | 10/2021 | Akhoundi | .............. G06N 3/047 |
| 2022/0023718 A1 | 1/2022 | Augustin et al. | |
| 2022/0088440 A1* | 3/2022 | Jaic | ................... A63B 22/0605 |
| 2022/0370882 A1* | 11/2022 | Liden | ................ A63B 24/0075 |

* cited by examiner

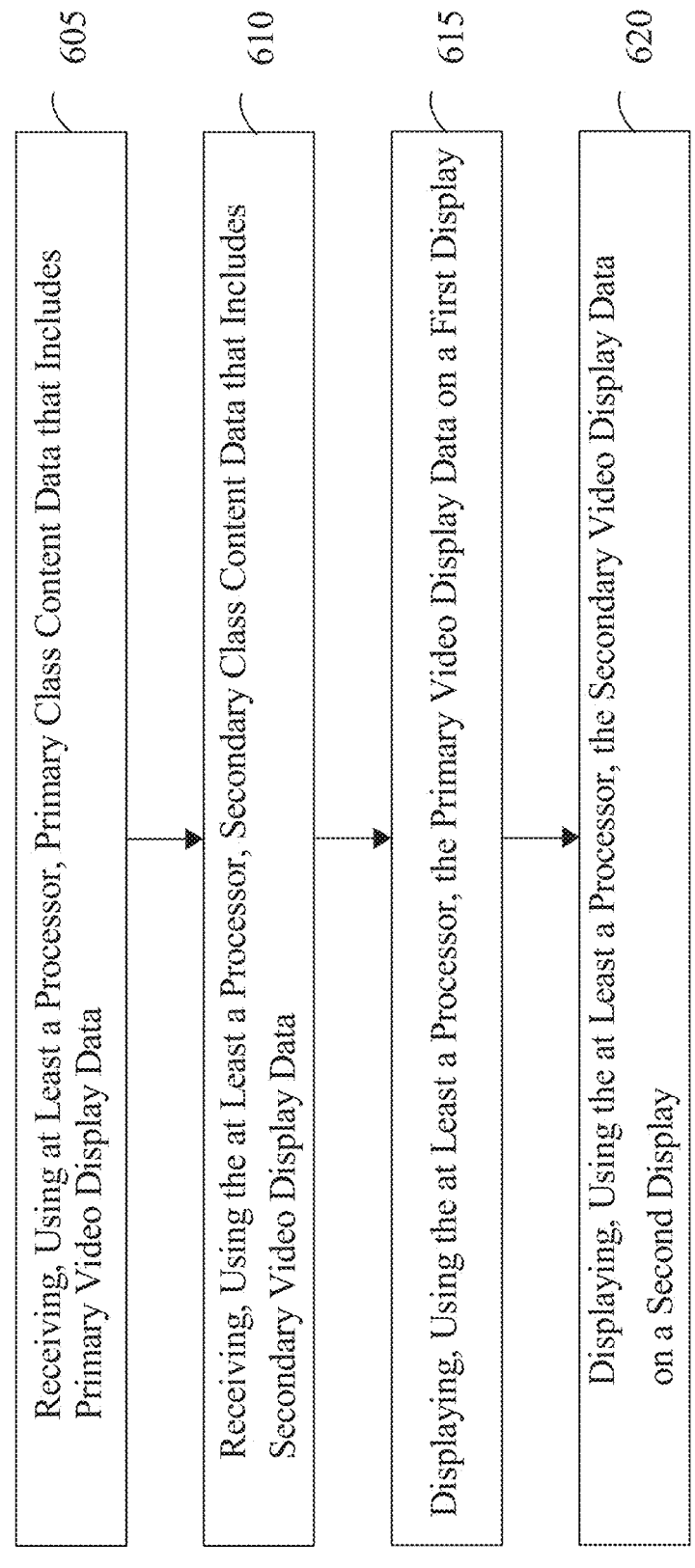

600

605 Receiving, Using at Least a Processor, Primary Class Content Data that Includes Primary Video Display Data 610 Receiving, Using the at Least a Processor, Secondary Class Content Data that Includes Secondary Video Display Data 615 Displaying, Using the at Least a Processor, the Primary Video Display Data on a First Display 620 Displaying, Using the at Least a Processor, the Secondary Video Display Data on a Second Display

FIG. 6

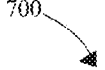

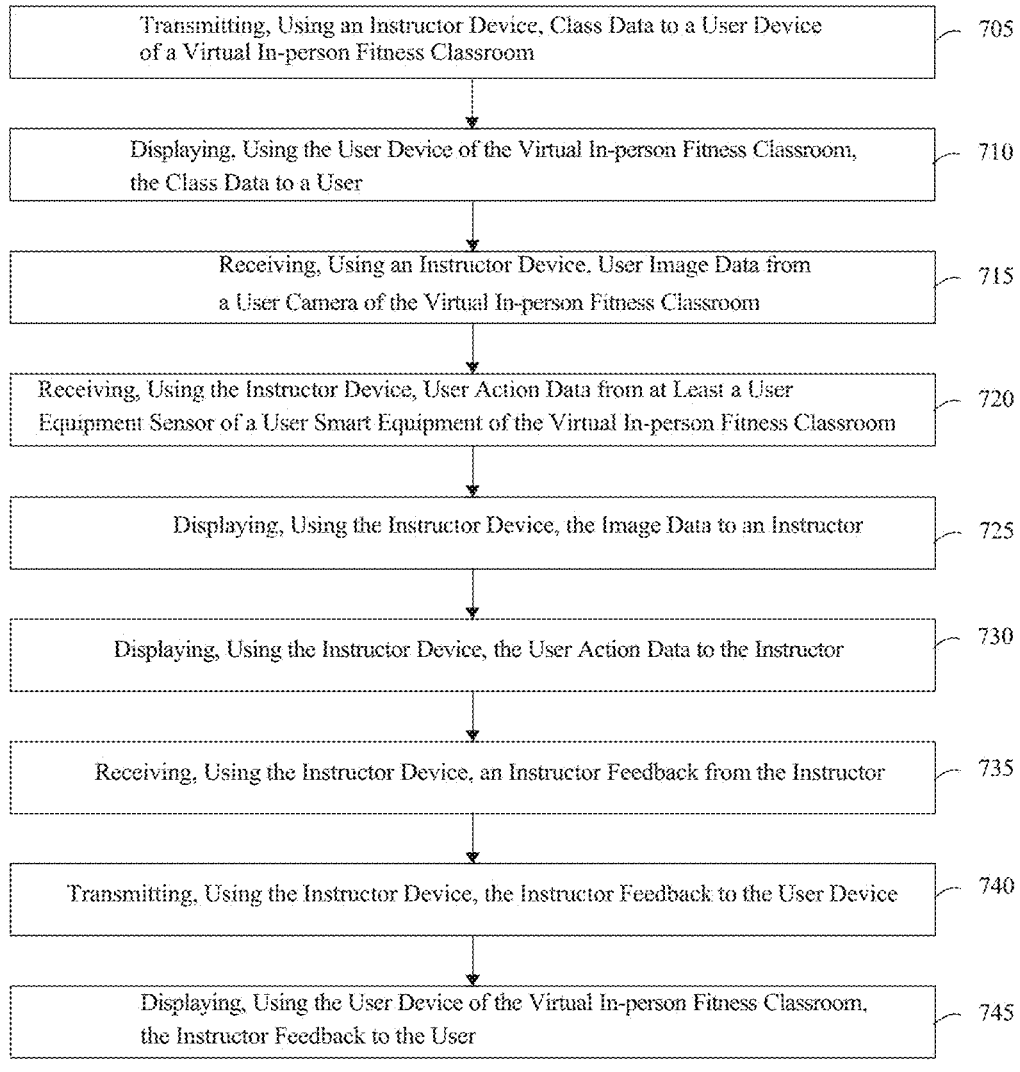

700

| | |
|---|---|
| Transmitting, Using an Instructor Device, Class Data to a User Device of a Virtual In-person Fitness Classroom | 705 |
| Displaying, Using the User Device of the Virtual In-person Fitness Classroom, the Class Data to a User | 710 |
| Receiving, Using an Instructor Device, User Image Data from a User Camera of the Virtual In-person Fitness Classroom | 715 |
| Receiving, Using the Instructor Device, User Action Data from at Least a User Equipment Sensor of a User Smart Equipment of the Virtual In-person Fitness Classroom | 720 |
| Displaying, Using the Instructor Device, the Image Data to an Instructor | 725 |
| Displaying, Using the Instructor Device, the User Action Data to the Instructor | 730 |
| Receiving, Using the Instructor Device, an Instructor Feedback from the Instructor | 735 |
| Transmitting, Using the Instructor Device, the Instructor Feedback to the User Device | 740 |
| Displaying, Using the User Device of the Virtual In-person Fitness Classroom, the Instructor Feedback to the User | 745 |

FIG. 7

FITNESS CLASSROOM ASSEMBLY AND A METHOD OF USE

CROSS-REFERENCE TO RELATED APPLICATIONS

This application is a continuation of Non-provisional application Ser. No. 18/369,023, filed on Sep. 15, 2023, and entitled "FITNESS CLASSROOM ASSEMBLY AND A METHOD OF USE," the entirety of which is incorporated herein by reference.

FIELD OF THE INVENTION

The present invention generally relates to the field of fitness. In particular, the present invention is directed to a fitness classroom assembly and a method of use.

BACKGROUND

The fitness industry is a rapidly growing market, with an increasing demand for innovative and effective workout solutions. Existing solutions to address the demand is not sufficient.

SUMMARY OF THE DISCLOSURE

In an aspect, a fitness classroom assembly is disclosed. The fitness classroom assembly includes a fitness classroom, wherein the fitness classroom includes a first display and a second display. The fitness classroom includes at least a processor and a memory communicatively connected to the at least processor. The memory includes instructions configuring the at least processor to primary class content data including primary video display data and secondary class content data including secondary video display data, display the primary video display element on the first display to a user and display the secondary video display element on the second display to the user.

In another aspect, a method of using a fitness classroom assembly is disclosed. The method includes receiving, using at least a processor, primary class content data including primary video display data, receiving, using the at least a processor, secondary class content data including secondary video display data, displaying, using the at least a processor, the primary video display data on a first display of a fitness classroom to a user and displaying, using the at least a processor, the secondary video display data on a second display of the fitness classroom to the user.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 6 is a flow diagram of an exemplary method of a use of a fitness classroom assembly;

FIG. 7 is a flow diagram of another exemplary method of a use of an apparatus of a fitness class.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to a fitness classroom assembly. The fitness classroom assembly includes a fitness classroom, wherein the fitness classroom includes a first display and a second display. The fitness classroom includes at least a processor and a memory communicatively connected to the at least processor. The memory includes instructions configuring the at least processor to receive primary class content data including primary video display data and secondary class content data including secondary video display data, display the primary video display element on the first display to a user and display the secondary video display element on the second display to the user.

In some embodiments, the fitness class can provide more engaging and interactive workout experience between a user and an instructor. In some embodiments, the fitness class can be conducted in a virtual or augmented reality environment, providing immersive visuals and audio that can enhance the workout experience. Exemplary embodiments illustrating aspects of the present disclosure are described below in the context of several specific examples.

Figure 1:
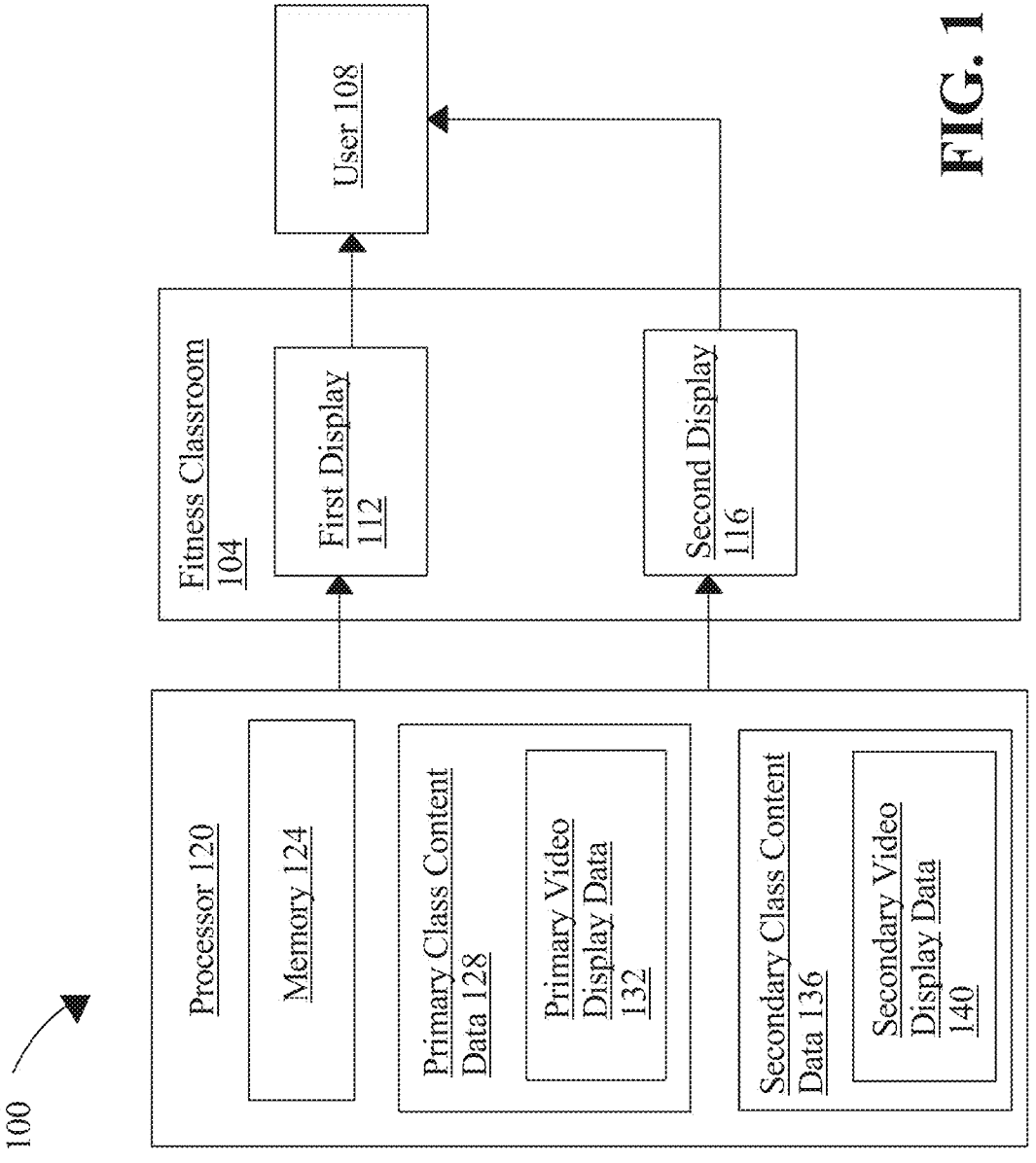
FIG. 1 is a block diagram of an exemplary embodiment of a fitness classroom assembly.

Referring now to FIG. 1, an exemplary embodiment of a fitness classroom assembly 100 for a fitness class is illustrated. The fitness classroom assembly 100 includes a fitness classroom 104. For the purposes of this disclosure, a "fitness classroom" is a space for a fitness class. For the purposes of this disclosure, a "fitness class" is a class for any type of physical exercises. As a non-limiting example, the fitness class may include a dance class, ballroom dancing class, Zumba class, aerobics class, circus techniques class, gymnastics class, Pilates class, kettlebell workouts class, circuit workouts class, partner-based exercises class, martial arts class, wrestling class, boxing class, jujutsu class, judo class, karate class, kung fu class, taekwondo class, hapkido class, Silat class, Escrima class, Arnis class, Kali class, boxing class, Muay Thai class, kickboxing class, tai chi class, yoga such as but not limited to hatha class, vinyasa class, Bikram class, restorative class, yin class, ashtanga class, Iyengar class, hot yoga class, and the like. In an embodiment, the fitness class may include a prerecorded class. In another embodiment, the fitness class may include a real-time live class. Persons skilled in the art, upon reviewing the entirety of this disclosure, may appreciate various fitness classes that may be used for the fitness classroom assembly 100.

With continued reference to FIG. 1, in some embodiments, a fitness classroom 104 may include a various types of classrooms. In some embodiments, the fitness classroom 104 may include a room with a plurality of sizes. As a non-limiting example, the fitness classroom 104 may include a room for 1 person, 2, 5, 10, 30, 50, 100 people, and the like. In an embodiment, the fitness classroom 104 may include an indoor classroom. In another embodiment, the fitness classroom 104 may include an outdoor classroom. As a non-limiting example, a fitness class may be held at a park, rooftop, and the like. In some embodiments, the fitness classroom 104 may include a personal space, such as but not limited to a user 108's room, house, office, and the like. In some embodiments, the fitness classroom 104 may include a virtual space. For the purposes of this disclosure, a "virtual space" is a space of computer-simulated environment. In some embodiments, the fitness classroom 104 may include an augmented space. For the purposes of this disclosure, a "augmented space" is a physical space overlaid with dynamically changing information. The fitness classroom 104 may be any space and a place a user 108 can exercise. For the purposes of this disclosure, a "user" is any person that is taking a fitness class. In some embodiments, the user 108 may include one or more users 108. As a non-limiting example, the one or more users 108 may include users 108 taking the fitness class at the same time. As another non-limiting example, the one or more users 108 may include past users 108 who previously took the fitness class.

With continued reference to FIG. 1, in some embodiments, a fitness classroom 104 includes a first display 112. For the purposes of this disclosure, a "first display" is a display that displays a primary class content element to a user. For the purposes of this disclosure, a "display" is a device that presents visual information or data. As a non-limiting example, the first display 112 may present primary class content element in one or more forms of text, graphics, images, video, and the like. In some embodiments, the first display 112 may include varying resolutions, sizes, and aspect ratios. In an embodiment, the first display 112 may be installed on a surface of ground, wall, ceiling, and the like. In another embodiment, the first display 112 may be portable. In some embodiments, the first display 112 may include a monitor, phone screen, laptop screen, tablet screen, a smart mirror, a smart watch, a headset screen, a virtual reality screen, an augmented reality screen, and the like. In some embodiments, the first display 112 may include different technologies, such as liquid crystal display (LCD,) a light-emitting diode (LED,) organic light-emitting diode (OLED,) plasma, projection, touch screen, and/or the like. The first display 112 disclosed herein is further described below and with respect to FIG. 2.

With continued reference to FIG. 1, in some embodiments, a fitness classroom 104 may include a plurality of first displays 112. As a non-limiting example, the fitness classroom 104 may include 1, 2, 3, 5, 8, 10, 12, and the like of the first displays 112. In an embodiment, the plurality of first displays 112 may include same types of first displays 112. As a non-limiting example, when the fitness classroom 104 includes three (3) first displays 112, all of the three first displays 112 may include monitors. In another embodiment, the plurality of first displays 112 may include different types of first displays 112. As a non-limiting example, when the fitness classroom 104 includes two (2) first displays 112, one first display 112 may include the monitor and another first display 112 may include a headset screen. In an embodiment, the plurality of first displays 112 may be installed on a same surface of the fitness classroom 104. As a non-limiting example, when the fitness classroom 104 includes three (3) first displays 112, the three first displays 112 may be installed on a wall of the fitness classroom 104. In another embodiment, the plurality of first displays 112 may be installed on a different location in the fitness classroom 104. As another non-limiting example, when the fitness classroom 104 includes three (3) first displays 112, one (1) first display 112 of the three first displays 112 may be installed on a wall of the fitness classroom 104 and another two (W) first displays 112 of the three first displays 112 may be installed on a ceiling of the fitness classroom 104.

With continued reference to FIG. 1, in some embodiments, a fitness classroom 104 includes a second display 116. For the purposes of this disclosure, a "second display" is a display that displays a secondary class content element to a user. As a non-limiting example, the second display 116 may present secondary class content element in one or more forms of text, graphics, images, video, and the like. In some embodiments, the second display 116 may include varying resolutions, sizes, and aspect ratios. In an embodiment, the second display 116 may be installed on a surface of ground, wall, ceiling, and the like. In another embodiment, the second display 116 may be portable. In some embodiments, the second display 116 may include a monitor, phone screen, laptop screen, tablet screen, a smart mirror, a smart watch, a headset screen, a virtual reality screen, an augmented reality screen, and the like. In some embodiments, the second display 116 may include different technologies, such as liquid crystal display (LCD,) a light-emitting diode (LED,) organic light-emitting diode (OLED,) plasma, projection, touch screen, and/or the like. The second display 116 disclosed herein is further described below and with respect to FIG. 2.

With continued reference to FIG. 1, in some embodiments, a fitness classroom 104 may include a plurality of second displays 116. As a non-limiting example, the fitness classroom 104 may include 1, 2, 3, 5, 8, 10, 12, and the like of the second displays 116. In an embodiment, the plurality of second displays 116 may include same types of second displays 116. As a non-limiting example, when the fitness classroom 104 includes three (3) second displays 116, all of the three second displays 116 may include monitors. In another embodiment, the plurality of second displays 116 may include different types of second displays 116. As a non-limiting example, when the fitness classroom 104 includes two (2) second displays 116, one second display 116 may include the monitor and another second display 116 may include a headset screen. In an embodiment, the plurality of second displays 116 may be installed on a same surface of the fitness classroom 104. As a non-limiting example, when the fitness classroom 104 includes three (3) second displays 116, the three second displays 116 may be installed on a wall of the fitness classroom 104. In another embodiment, the plurality of second displays 116 may be installed on a different location in the fitness classroom 104. As another non-limiting example, when the fitness classroom 104 includes three (3) second displays 116, one (1) second display 116 of the three second displays 116 may be installed on a wall of the fitness classroom 104 and another two (W) second displays 116 of the three second displays 116 may be installed on a ceiling of the fitness classroom 104.

With continued reference to FIG. 1, a fitness classroom assembly 100 includes at least a processor 120. The at least a processor may include, without limitation, any processor described in this disclosure. The computing device may include without limitation a microcontroller, microprocessor, digital signal processor (DSP) and/or system on a chip (SoC) as described in this disclosure. The computing device may include, be included in, and/or communicate with a mobile device such as a mobile telephone or smartphone. The computing device may include a single computing device operating independently, or may include two or more computing device operating in concert, in parallel, sequentially or the like; two or more computing devices may be included together in a single computing device or in two or more computing devices. The computing device may interface or communicate with one or more additional devices as described below in further detail via a network interface device. Information (e.g., data, software etc.) may be communicated to and/or from a computer and/or a computing device. The computing device may include but is not limited to, for example, a computing device or cluster of computing devices in a first location and a second computing device or cluster of computing devices in a second location. The computing device may include one or more computing devices dedicated to data storage, security, distribution of traffic for load balancing, and the like. The computing device may distribute one or more computing tasks as described below across a plurality of computing devices of computing device, which may operate in parallel, in series, redundantly, or in any other manner used for distribution of tasks or memory between computing devices. The at least a processor 120 may be implemented, as a non-limiting example, using a "shared nothing" architecture.

With continued reference to FIG. 1, a computing device may be designed and/or configured to perform any method, method step, or sequence of method steps in any embodiment described in this disclosure, in any order and with any degree of repetition. For instance, the computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. The computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing. In some embodiments, the computing device may include a memory communicatively connected to the computing device, containing instructions configuring the computing device to do any methods, method step, or sequence of method steps in any embodiment described in this disclosure, in any order and with any degree of repetition.

With continued reference to FIG. 1, an fitness classroom assembly 100 includes a memory 124 communicatively connected to at least a processor 120. For the purposes of this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, a memory 124 includes instructions configuring at least a processor 120 to receive primary class content data and display the primary class content data 128 on a first display 112 to a user 108. In an embodiment, the at least a processor 120 may receive a primary class content data 128. For the purposes of this disclosure, "primary class content data" is data related to a fitness class. In an embodiments, primary class content data 128 may be stored and/or retrieved in and/or from a fitness database. The fitness database disclosed herein is further described with respect to FIG. 2. In another embodiments, the primary class content data 128 may be stored and/or retrieved in and/or from an instructor device. The instructor device disclosed herein is further described with respect to FIG. 2. In some embodiments, the primary class content data 128 includes primary video display data 132. For the purposes of this disclosure, "primary video display data" is primary class content data that is related to a video that is displayed on a first display and/or a second display.

With continued reference to FIG. 1, as a non-limiting example, primary video display data 132 may include instructor image data. For the purposes of this disclosure, "instructor image data" is visual information representing an instructor. In some embodiments, the instructor image data may include a plurality of images of an instructor. As a non-limiting example, the instructor image data may include a photo of the instructor. As another non-limiting example, the instructor image data may include a video of the instructor. For example and without limitation, the instructor image data may include a prerecorded video of the instructor providing a fitness class. For another example and without limitation, the instructor image data may include a livestream video of the instructor providing a fitness class in real-time. For the purposes of this disclosure, an "instructor" is any person that is providing a fitness class to a user. In some embodiments, the instructor may include one or more instructors. As a non-limiting example, the one or more instructors may include instructors providing the fitness class at the same time. As another non-limiting example, the one or more instructors may include past instructors who previously provided the fitness class. In an embodiments, instructor image data of primary video display data 132 of primary class content data 128 may be received from a fitness database. The fitness database disclosed herein is further described with respect to FIG. 2. In another embodiments, instructor image data of primary video display data 132 of primary class content data 128 may be received from an instructor camera. The instructor camera disclosed herein is further described with respect to FIG. 2.

With continued reference to FIG. 1, as a non-limiting example, primary video display data 132 may include instructor voice data. For the purposes of this disclosure, "instructor voice data" is audio information related to a fitness class from an instructor. As a non-limiting example, the instructor voice data may include an instructor's instructions related to the fitness class. For the purposes of this disclosure, an "instruction" a direction that provides a user related to a fitness class. For example and without limitation, the instruction may include instructions related to exercise position, which part of a body to focus, amount of time to do the exercise for the fitness class, any information about the fitness class. As another non-limiting example, the instructor voice data may include encouragement. For the purposes of this disclosure, an "encouragement" is anything that gives a user a support, confidence, or hope about a fitness class. In an embodiments, instructor voice data of primary video display data 132 of primary class content data 128 may be received from a fitness database. The fitness database disclosed herein is further described with respect to FIG. 2. In another embodiments, instructor voice data of primary video display data 132 of primary class content data 128 may be received from an instructor camera. The instructor camera disclosed herein is further described with respect to FIG. 2.

With continued reference to FIG. 1, a memory 124 includes instructions configuring at least a processor 120 to receive secondary class content data 136 and display the secondary class content data 136 on a second display 116 to a user 108. For the purposes of this disclosure, "secondary class content data" is supplementary data to primary class content data related to a fitness class. In an embodiments, secondary class content data 136 may be stored and/or retrieved in and/or from a fitness database. The fitness database disclosed herein is further described with respect to FIG. 2. In another embodiments, the secondary class content data 136 may be stored and/or retrieved in and/or from an instructor device. The instructor device disclosed herein is further described with respect to FIG. 2.

With continued reference to FIG. 1, in some embodiments, secondary class content data 136 includes secondary video display data 140. For the purposes of this disclosure, "secondary video display data" is supplementary data to primary video display data that is related to a video that is displayed on a first display and/or a second display. as a non-limiting example, secondary video display data 140 may include secondary image data. For the purposes of this disclosure, "secondary image data" is supplementary visual information to instructor image data. In some embodiments, the secondary image data may include icon, image, text, video, animation, force, pressure, light, and the like. For example and without limitation, the secondary image data may include a slow motion video of the instructor image data of primary video display data 132 of primary class content data 128. For the purposes of this disclosure, "slow motion video" is a video that is played more slowly that it was recorded. For example and without limitation, the secondary image data may include a detailed body motion video of the instructor image data of primary video display data 132 of primary class content data 128. For the purposes of this disclosure, "detailed body motion video" is a video that shows a portion of a body part that is needed to be focused on to show a detailed movement of the body part. As a non-limiting example, when the exercise is a squat, the detailed body motion video may include an animation video of glutes and thighs to show how the body parts move during the squat. Persons skilled in the art, upon reviewing the entirety of this disclosure, may appreciate various types of the detailed body motion video that may be used for secondary image data. Persons skilled in the art, upon reviewing the entirety of this disclosure, may appreciate various types of the secondary image data that may be used in a fitness classroom assembly 100. In an embodiments, the secondary image data of secondary video display data 140 of secondary class content data 136 may be received from a fitness database. The fitness database disclosed herein is further described with respect to FIG. 2. In another embodiments, the secondary image data of the secondary video display data 140 of the secondary class content data 136 may be received from an instructor device. The instructor device disclosed herein is further described with respect to FIG. 2.

With continued reference to FIG. 1, as a non-limiting example, secondary video display data 140 may include secondary voice data. For the purposes of this disclosure, "secondary voice data" is supplementary audio information to secondary image data. As a non-limiting example, the secondary voice data may include detailed instructions related to an exercise. For example and without limitation, the detailed instruction may include instructions related to exercise position, which part of a body to focus, which muscles to focus on, amount of time to do the exercise for the fitness class, any information about the exercise. As another non-limiting example, the secondary voice data may include encouragement. In an embodiments, secondary voice data of secondary video display data 140 of secondary video display data 140 may be received from a fitness database. The fitness database disclosed herein is further described with respect to FIG. 2. In another embodiments, the secondary voice data of the secondary video display data 140 of secondary primary class content data 128 may be received from an instructor device. The instructor device disclosed herein is further described with respect to FIG. 2.

Figure 2:
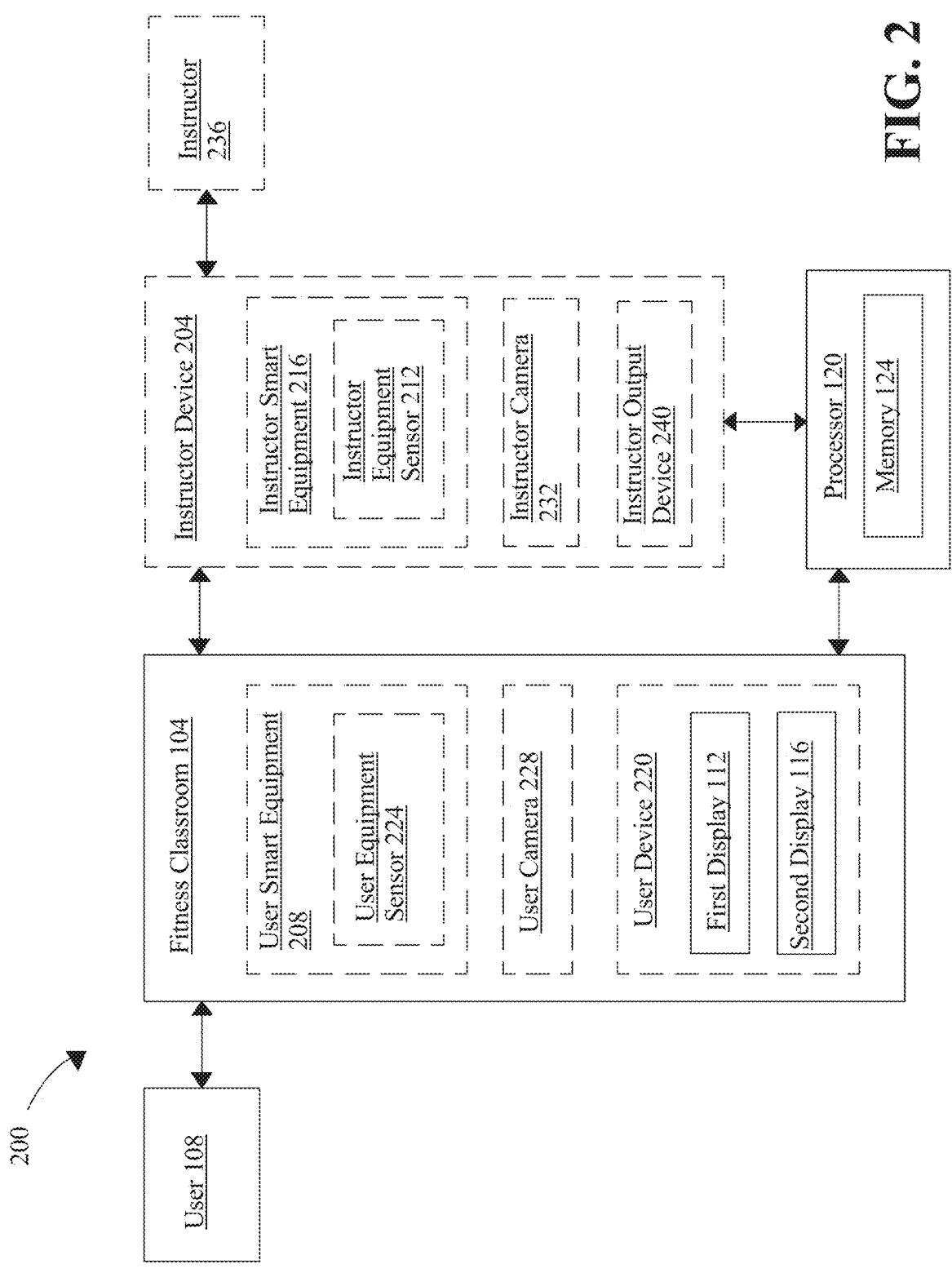
FIG. 2 is a block diagram of another exemplary embodiment of a fitness classroom assembly.

Referring now to FIG. 2, a block diagram of another exemplary embodiment of an apparatus 200 of a fitness class is disclosed. The apparatus 200 may be consistent with an fitness classroom assembly 100 disclosed with respect to FIG. 2. The apparatus 200 may include a fitness classroom 104. In some embodiments, the fitness classroom 104 may include a network interface device. Network interface device may be utilized for connecting a user device 220 and/or an instructor device 204 to one or more of a variety of networks, and one or more devices. The user device 220 and the instructor device 204 disclosed herein are further described below. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. The network interface device disclosed herein may include any network interface device in the entirety of this disclosure.

With continued reference to FIG. 2, in some embodiments, a fitness classroom 104 may include user smart (US) equipment 208. For the purposes of this disclosure, "user smart equipment" is equipment that operates interactively with a user. In an embodiment, the US equipment 208 may be installed on a surface of the fitness classroom, such as but not limited to ground, wall, ceiling, and the like. In another embodiment, the US equipment 208 may be portable. In an embodiment, the US equipment 208 may include a smart mat. For the purposes of this disclosure, a "smart mat" is an exercise mat that interacts with a person on the mat. In another embodiment, the US equipment 208 may include a wearable device. A "wearable device," as used in this disclosure, is a device on a person that collects data of the person, where "on the person" indicates that the device is portable and is either worn on the person, inside the person, in contact with the person, or in close proximity to the person.

With continued reference to FIG. 2, in some embodiments, a US equipment 208 may include an indicator. For the purposes of this disclosure, an "indicator" is an auxiliary element that indicates a user and/or an instructor related to a fitness class. In an embodiment, the indicator may be mechanically coupled on the US equipment 208. In another embodiment, the indicator may be embedded in the US equipment 208. In some embodiments, the indicator of the US equipment 208 may receive an instructor feedback from an instructor device 204 and display the instructor feedback to a user 108. As a non-limiting example, the US equipment 208 may receive instructor action data from at least an instructor equipment (IE) sensor 212 of instructor smart (IS) equipment 216 of the instructor device and indicator may display the instructor action data of the instructor feedback on the US equipment 208 to the user 108. In some embodiments, the indicator of the US equipment 208 may receive an analytic feedback from a user device 220 and display the analytic feedback to the user 108. In some embodiments, the indicator of the US equipment 208 may receive a class feedback and display the class feedback to the user 108. In some embodiments, the indicator of the user smart equipment 208 may receive secondary class content data 136 and display the secondary class content data 136 to the user 108. As a non-limiting example, the secondary class content data 136 may include an instructor feedback. As a non-limiting example, the instructor feedback may include instructor action data.

With continued reference to FIG. 2, in an embodiment, an indicator may include a light indicator. For the purposes of this disclosure, a "light indicator" is an indicator that indicates information using light. As a non-limiting example, the light indicator may indicate which portion of the US equipment 208 a user 108 has to put more weight by lighting the portion of the US equipment 208. As another non-limiting example, the light indicator may indicate which portion of the US equipment 208 the user 108 has to change a body position by lighting the portion of the US equipment 208. As another non-limiting example, the light indicator may display a class feedback, instructor feedback, analytic feedback, and/or the like. In some embodiments, the light indicator may include light emitting diodes (LED), incandescent lights, liquid crystal display (LCD) screen, neon lamp, and the like. A size of the light indicator may vary. In some embodiments, the light indicator may include a plurality of light indicators. In some embodiments, the light indicator may include a flash pattern. For the purposes of this disclosure, a "flash pattern" is a pattern of flashing. In an embodiment, flash pattern may include a rate of flashing. As a non-limiting example, the flash pattern may include 10, 20, 25, 45, 50 flashes per minute, and the like. In another embodiment, flash pattern may include a light animation. For the purposes of this disclosure, "light animation" refers to a method by which still lights are manipulated to appear as they are moving. As a non-limiting example, the light animation may show that the light indicators are pointing at a certain direction. As another limiting example, the light animation may show that the light indicators circling around a user smart equipment 208. In some embodiments, the light indicator may include a color pattern. The light animation disclosed herein is further described in detail below. For the purposes of this disclosure, a "color pattern" is a type of lighting effect using a color. As a non-limiting example, the plurality of colors may include red, purple, green, black, blue, orange, yellow, white, and/or any combination thereof. As a non-limiting example, the light indicator of a US equipment 208 may flash in red to indicate a position of a user 108 is not correct. As another non-limiting example, the light indicator of the US equipment 208 may flash in red to indicate a weight distribution of the user 108 is not correct. As another non-limiting example, the light indicator of a US equipment 208 may flash in green to indicate the weight distribution of the user 108 is correct.

With continued reference to FIG. 2, in another embodiment, an indicator may include a sound indicator. For the purposes of this disclosure, a "sound indicator" is an indicator that indicates information using sound. In an embodiment, the sound may be indicative sound. For the purposes of this disclosure, "indicative sound" refers to any sound that is configured to indicate information. As a non-limiting example, the indicative sound may indicate that a position of a user 108 is not correct. As another non-limiting example, the indicative sound may indicate that a weight distribution of the user 108 is not correct. As another non-limiting example, the indicative sound may indicate that a weight distribution of the user 108 is correct. As another non-limiting example, the indicative sound may indicate that a weight distribution of the user 108 is correct. As another non-limiting example, the sound indicator may display a class feedback, instructor feedback, analytic feedback, and/or the like. In some embodiments, a sound indicator may include a sound pattern. For the purposes of this disclosure, a "sound pattern" is any type of arrangement of making a sound. As a non-limiting example, a sound indicator may repeat a sound twice in one second.

With continued reference to FIG. 2, in another embodiment, an indicator may include a vibration indicator. For the purposes of this disclosure, a "vibration indicator" is an indicator that indicates information using vibration. For the purposes of this disclosure, "vibration" is an oscillation about an equilibrium point of an object. As a non-limiting example, the vibration indicator may indicate that a position of a user 108 is not correct. As another non-limiting example, the vibration indicator may indicate that a weight distribution of the user 108 is not correct. As another non-limiting example, the vibration indicator may indicate that a weight distribution of the user 108 is correct. As another non-limiting example, the vibration indicator may indicate that a weight distribution of the user 108 is correct. As another non-limiting example, the vibration indicator may display a class feedback, instructor feedback, analytic feedback, and/or the like. In some embodiments, a vibration indicator may include a vibration pattern. For the purposes of this disclosure, a "vibration pattern" refers a rate of vibration. As a non-limiting example, a vibration indicator may repeat vibration two times in one second.

With continued reference to FIG. 2, in another embodiment, an indicator may include a pressure indicator. For the purposes of this disclosure, a "pressure indicator" is an indicator that indicates information using pressure. For the purposes of this disclosure, "pressure" is the force applied perpendicular to the surface of a human body per unit area over which that force is distributed. As a non-limiting example, the pressure indicator may indicate that a position of a user 108 is not correct. As another non-limiting example, the pressure indicator may indicate that a weight distribution of the user 108 is not correct. As another non-limiting example, the pressure indicator may indicate that a weight distribution of the user 108 is correct. As another non-limiting example, the pressure indicator may indicate that a weight distribution of the user 108 is correct. As another non-limiting example, the pressure indicator may display a class feedback, instructor feedback, analytic feedback, and/or the like. In some embodiments, a vibration indicator may include a pressure pattern. For the purposes of this disclosure, a "pressure pattern" refers a rate of pressure. As a non-limiting example, the pressure indicator may repeat putting pressure two times in one second. As another non-limiting example, the pressure indicator may put pressure on a user 108's body for 3 seconds.

With continued reference to FIG. 2, in some embodiments, US equipment 208 may include at least a user equipment (UE) sensor 224. For the purposes of this disclosure, a "user equipment sensor" is a sensor for a user smart equipment. The UE sensor 224 may include any sensors disclosed in the entirety of this disclosure. In some embodiments, the at least a UE sensor 224 may be communicatively connected to the US equipment 208. In some embodiments, a fitness classroom assembly 100 may include at least a sensor. The at least a sensor may include a UE sensor 224, instructor equipment sensor, and the like. The at least a sensor may be implemented on US equipment 208, user camera 228, user device 220, instructor device, or any device disclosed in the entirety of this disclosure. For the purposes of this disclosure, a "sensor" is a device that produces an output signal for the purpose of sensing a physical phenomenon. For example and without limitation, the at least a sensor may transduce a detected phenomenon, such as without limitation, temperature, voltage, current, pressure, speed, motion, light, moisture, and the like, into a sensed signal. The at least a sensor may include any computing device as described in the entirety of this disclosure and configured to convert and/or translate a plurality of signals detected into electrical signals for further analysis and/or manipulation. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Any datum captured by the at least a sensor may include circuitry, computing devices, electronic components, or a combination thereof that translates into at least an electronic signal configured to be transmitted to another electronic component. In a non-limiting embodiment, the at least a sensor may include a plurality of sensor comprised in a sensor suite. Persons skilled in the art, upon reviewing the entirety of this disclosure, will be aware of various sensors that may be used as the at least a sensor consistently with this disclosure.

With continued reference to FIG. 2, in an embodiment, at least a sensor may include a temperature sensor. For the purposes of this disclosure, a "temperature sensor" is a device that detects thermal energy and outputs an electrical signal as a function of the detection of thermal energy. As a non-limiting example, the temperature sensor may include thermocouples, thermistors, thermometers, passive infrared sensors, resistance temperature sensors (RTD's), semiconductor based integrated circuits (IC), a combination thereof or another undisclosed sensor type, alone or in combination. For the purposes of this disclosure and as would be appreciated by someone of ordinary skill in the art, "temperature" is a measure of the heat energy of a system. Temperature, as measured by any number or combinations of sensors, may be measured in Fahrenheit (° F.), Celsius (° C.), Kelvin (° K), or another scale alone or in combination. The temperature measured by sensors may comprise electrical signals which are transmitted to their appropriate destination wireless or through a wired connection. Persons skilled in the art, upon reviewing the entirety of this disclosure, will be aware of various temperature sensors that may be used as the at least a sensor consistently with this disclosure.

With continued reference to FIG. 2, in another embodiment, at least a sensor may include a force sensor. For the purposes of this disclosure, a "force sensor" is a sensor that converts an input mechanical load, weight, tension, compression, or pressure into an electrical output signal. As a non-limiting example, the force sensor may include a tension force sensor, compression force sensor, tension and compression force sensor, and the like. As another non-limiting example, the force sensor may include a strain gauge, load cell, piezoelectric sensor, capacitive sensor, magnetic sensor, and the like. In some embodiments, the force sensor may be configured to transform a pressure into an analogue electrical signal. In some embodiments, the force sensor may be configured to transform a force into a digital signal. Persons skilled in the art, upon reviewing the entirety of this disclosure, will be aware of various force sensors that may be used as the at least a sensor consistently with this disclosure.

With continued reference to FIG. 2, in another embodiment, at least a sensor may include a moisture sensor. "Moisture", as used in this disclosure, is the presence of water, which may include vaporized water in air, condensation on the surfaces of objects, or concentrations of liquid water. Moisture may include humidity. "Humidity", as used in this disclosure, is the property of a gaseous medium (almost always air) to hold water in the form of vapor. Persons skilled in the art, upon reviewing the entirety of this disclosure, will be aware of various moisture sensors that may be used as the at least a sensor consistently with this disclosure.

With continued reference to FIG. 2, in another embodiment, at least a sensor may include a motion sensor. The motion sensor may include, without limitation, a microelectromechanical system (MEMS) sensor. The motion sensor may include, without limitation, an inertial measurement unit (IMU). The motion sensor may include one or more accelerometers; one or more accelerometers may include a plurality of accelerometers, such as three or more accelerometers positioned to span three dimensions of possible acceleration, so that any direction and magnitude of acceleration in three dimensions may be detected and measured in three dimensions. The motion sensor may include one or more gyroscopes; one or more gyroscopes may include a plurality of gyroscopes, such as three or more gyroscopes positioned to span three dimensions of possible acceleration, so that any direction and magnitude of change in angular position in three dimensions may be detected and measured in three dimensions. The motion sensor may include, without limitation magnetic sensors such as Hall effect sensors, compasses such as solid-state compasses, or the like. In some embodiments, the motion sensor may detect a motion of a user 108. Persons skilled in the art, upon reviewing the entirety of this disclosure, will be aware of various motion sensors that may be used as the at least a sensor consistently with this disclosure.

With continued reference to FIG. 2, in another embodiment, at least a sensor may include a biometric sensor. For the purposes of this disclosure, a "biometric sensor" is a sensor that detects any biometrics of a human. For the purposes of this disclosure, a "biometric" a biological (anatomical and physiological) and behavioral characteristic of a human. As a non-limiting example, the biometric sensor may include electrocardiography (ECG), electrooculography (EOG), bioimpedance, blood pressure and heart rate monitoring, oxygenation data, eye tracking system, facial recognition, body measurements, and the like. Persons skilled in the art, upon reviewing the entirety of this disclosure, will be aware of various biometric sensors that may be used as the at least a sensor consistently with this disclosure.

With continued reference to FIG. 2, in some embodiments, at least a sensor may output a sensed signal. As a non-limiting example, the sensed signal of at least a UE sensor 224 may include user action data. For the purposes of this disclosure, "user action data" is data related to user's motion and any phenomenon resulted by the user's motion. In some embodiments, the user action data may be stored in a fitness database. In some embodiments, a user 108 may manually input user action data using a user device 220 such as without limitation a mobile phone, a laptop, a tablet, and the like. In some embodiments, the user action data may be retrieved from the fitness database. The fitness database disclosed herein is further described below. In some embodiments, the at least a UE sensor 224 may transmit the user action data to an instructor device 204. In some embodiments, the user action data may be displayed on a second display 116. As a non-limiting example, the user action data that may include weight distribution of a user 108 during an exercise may be displayed on the second display 116 to the user 108. As another non-limiting example, the user action data that may include speed of the user 108's legs during the exercise may be displayed on the second display 116 to the user 108. In some embodiments, the at least a UE sensor 224 may be communicatively connected to a user device 220. The instructor device 204 disclosed herein is further described below. Additionally and without limitation, the user action data disclosed herein may be consistent with class action data found in U.S. patent application Ser. No. 18/368,867, filed on Sep. 15, 2023, and entitled "SYSTEMS AND METHODS FOR fitness CLASS GENERATION,", the entirety of which is incorporated by reference.

With continued reference to FIG. 2, as a non-limiting example, user action data may include user temperature data, user force data, user moisture data, user motion data, user biometric data, and the like. For the purposes of this disclosure, "user temperature data" is data from a temperature sensor of at least a UE sensor. As a non-limiting example, the user temperature data may include a temperature of a user 108's body during a fitness class. For the purposes of this disclosure, "user force data" is data from a force sensor of at least a UE sensor. As a non-limiting example, the user force data may include a force a user 108 exerted on different parts of user smart equipment 208 such as but not limited to a smart mat, wearable device, and the like. For the purposes of this disclosure, "user moisture data" is data from a moisture sensor of at least a UE sensor. As a non-limiting example, the user moisture data may include amount of sweat of a user 108. For the purposes of this disclosure, "user motion data" is data from a motion sensor of at least a UE sensor. As a non-limiting example, the user motion data may include how fast a user 108 move arms, legs, or any parts of the user 108's body. As another non-limiting example, the user motion data may include acceleration or deceleration of a user 108's body movement. For the purposes of this disclosure, "user biometric data" is data from a biometric sensor of at least a UE sensor. As a non-limiting example, the user biometric data may include user 108's blood pressure during the fitness class. As another non-limiting example, the user biometric data may include user 108's heart rate during the fitness class. As another non-limiting example, the user biometric data may include measurements of a user 108's body. Persons skilled in the art, upon reviewing the entirety of this disclosure, will be aware of various user action data from the at least a UE sensor 224 that may be used consistently with this disclosure.

With continued reference to FIG. 2, a fitness classroom may include a user camera 228. For the purposes of this disclosure, a "user camera" is a camera used by a user. In some embodiments, the user camera 228 may be on various place from various angles. As a non-limiting example, the user camera 228 may be overhead, front, back, any sides of a user 108. In some embodiments, the user camera 228 may include a plurality of cameras providing user image data with multiple angles of the user 108. The user image disclosed herein is further described below.

With continued reference to FIG. 2, as used in this disclosure, a "camera" is a device that is configured to sense electromagnetic radiation, such as without limitation visible light, and generate an image representing the electromagnetic radiation. In some cases, a camera may include one or more optics. Exemplary non-limiting optics include spherical lenses, aspherical lenses, reflectors, polarizers, filters, windows, aperture stops, and the like. In some cases, at least a camera may include an image sensor. Exemplary non-limiting image sensors include digital image sensors, such as without limitation charge-coupled device (CCD) sensors and complimentary metal-oxide-semiconductor (CMOS) sensors, chemical image sensors, and analog image sensors, such as without limitation film. In some cases, a camera may be sensitive within a non-visible range of electromagnetic radiation, such as without limitation infrared.

With continued reference to FIG. 2, in some cases, image data may be generated by a camera. As used in this disclosure, "image data" is information representing at least a physical scene, space, and/or object (e.g., a user, an instructor, and the like.) As a non-limiting example, the user camera 228 may generate user image data. The user image data disclosed herein is further described below. As another non-limiting example, an instructor camera 232 may generate instructor image data. The instructor camera 232 and the instructor image data disclosed herein are further described below. "Image data" may be used interchangeably through this disclosure with "image," where image is used as a noun. An image may be optical, such as without limitation where at least an optic is used to generate an image of an object. An image may be material, such as without limitation when film is used to capture an image. An image may be digital, such as without limitation when represented as a bitmap. Alternatively, an image may be comprised of any media capable of representing a physical scene, space, a user 108, an instructor 236, and/or object.

Alternatively where "image" is used as a verb, in this disclosure, it refers to generation and/or formation of an image. In an embodiment, the image data may be stored in a fitness database. In another embodiment, the image data may be retrieved from the fitness database.

With continued reference to FIG. 2, an exemplary camera may include an OpenMV Cam H7 from OpenMV, LLC of Atlanta, Georgia, U.S.A. OpenMV Cam includes a small, low power, microcontroller which allows execution of processes. OpenMV Cam comprises an ARM Cortex M7 processor and a 640×480 image sensor operating at a frame rate up to 150 fps. OpenMV Cam may be programmed with Python using a Remote Python/Procedure Call (RPC) library. OpenMV CAM may be used to operate image classification and segmentation models, such as without limitation by way of TensorFlow Lite; detect motion, for example by way of frame differencing algorithms; detect markers, for example blob detection; detect objects, for example face detection; track eyes; detection persons, for example by way of a trained machine learning model; detect camera motion, for example by way of optical flow detection; detect and decode barcodes; capture images; and record video. Persons skilled in the art, upon reviewing the entirety of this disclosure, will be aware of various types of cameras that may be used for the disclosure.

With continued reference to FIG. 2, in some embodiments, a camera may include a plurality of cameras, where the plurality of cameras may capture two or more perspectives. The plurality of cameras may be used for three-dimensional display. The camera may include a stereo-camera. As used in this disclosure, a "stereo-camera" is a camera that senses two or more images from two or more vantages. As used in this disclosure, a "vantage" is a location of a camera relative a scene, space and/or object which the camera is configured to sense. In some cases, a stereo-camera may determine depth of an object in a scene as a function of parallax. As used in this disclosure, "parallax" is a difference in perceived location of a corresponding object in two or more images. An exemplary stereo-camera may include TaraXL from e-con Systems, Inc of San Jose, California. TaraXL is a USB 3.0 stereo-camera which is optimized for NVIDIA® Jetson AGX Xavier™/Jetson™ TX2 and NVIDIA GPU Cards. TaraXL's accelerated Software Development Kit (TaraXL SDK) is capable of doing high quality 3D depth mapping of WVGA at a rate of up to 60 frames per second. TaraXL is based on MT9V024 stereo sensor from ON Semiconductor. Additionally, TaraXL includes a global shutter, houses 6 inertial measurement units (IMUs), and allows mounting of optics by way of an S-mount lens holder. TaraXL may operate at depth ranges of about 50 cm to about 300 cm. The camera may be implemented in any suitable user device 220 and/or instructor device 204 disclosed in the entirety of this disclosure.

With continued reference to FIG. 2, in some embodiments, a user camera 228 may detect user image data. For the purposes of this disclosure, "user image data" is visual information representing a user. In some embodiments, the user image data includes a plurality of images of a user 108. As a non-limiting example, the user image data may include a photo of the user 108. As another non-limiting example, the user image data may include a video of the user 108. For example and without limitation, the user image data may include a prerecorded video of the user 108 taking a fitness class. For another example and without limitation, the user image data may include a live-stream video of the user 108 taking a fitness class in real-time. In some embodiments, the user image data may be stored in a fitness database. In some embodiments, the user image data may be retrieved from the fitness database. In some embodiments, the user camera 228 may be communicatively connected to a user device 220. The user camera 228 may transmit the user image data to the user device 220. In some embodiments, the user camera 228 may be communicatively connected to an instructor device 204 such as without imitation an instructor display device. The user camera 228 may transmit the user image data to the instructor display device of the instructor device 204.

With continued reference to FIG. 1, in some embodiments, processor 120 may include an implementation of a computer vision model configured to process, analyze, and/or interpretate user image data as described above. A "computer vision model," for the purpose of this disclosure, is a computation model designed to interpret and make determinations based on visual data. Visual data may include any data received from one or more cameras described above. In an embodiment, computer vision model may process user image data or any other visual data described herein, to make a determination about a scene, space, and/or object thereof. In a non-limiting example, computer vision model may be used for registration of virtual avatars and/or other visual elements within view feed as described in further detail below. In some cases, registration may include image processing described herein, such as without limitation object recognition, feature detection, edge/corner detection, and the like. Non-limiting example of feature detection may include scale invariant feature transform (SIFT), Canny edge detection, Shi Tomasi corner detection, and the like. In some cases, registration may include one or more transformations to orient a user image relative a 3D coordinate system; exemplary transformations include without limitation homography transforms and affine transforms. In an embodiment, registration of user image data or other visual data to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto the given visual data; however, a third dimension of registration, representing depth and/or a z axis, may be detected by utilizing depth-sensing techniques such as Doppler imaging. Alternatively, the third dimension may be inferred from the known geometry and orientation of the imaging device (e.g., cameras), or through the application of one or more machine learning models trained to interpret depth from the two-dimensional projection.

With continued reference to FIG. 2, in some embodiments, a fitness classroom 104 may include a query device. For the purposes of this disclosure, a "query device" is a button that a user use to input a user query. As a non-limiting example, the query device may include keyboards, joy sticks, tracker balls, switches, buttons, sliders, touchscreens, and the like. In some embodiments, the query device may be implemented on any devices in the fitness classroom. As a non-limiting example, the query device may be implemented on a US equipment 208, a user device 220, and the like. For the purposes of this disclosure, a "user query" is a question that a user has related to a fitness class to an instructor. In some embodiments, the user query may include a text, audio, icon, image, video, and the like. As a non-limiting example, the user query may include any questions related to an exercise, a position of the exercise, amount of time of the exercise, speed of the exercise, the user's performance of the exercise, and the like. A user 108 may input user query anytime in the fitness class.

With continued reference to FIG. 2, a fitness classroom 104 may include a user device 220. For the purposes of this disclosure, a "user device" is a device that a user use to take a fitness class. In an embodiment, the user device 220 may be configured to receive class data. In some embodiments, the user device 220 is configured to display the class data. In some embodiments, the class data may be displayed on a display of a user output device of the user device 220. As a non-limiting example, instructor image data may be displayed on the display. As another non-limiting example, an instructor feedback may be displayed on the display. In some embodiments, the class data may be displayed on an indicator of the user device 220. As a non-limiting example, the instructor feedback may be displayed on the display. The instructor feedback and the indicator disclosed herein are further described below. A user 108 may exercise using the class data displayed on the user device 220. The class data disclosed herein is further described below. For the purposes of this disclosure, "class data" is any data generated by an instructor, which are related to a fitness class. The class data disclosed herein may be consistent with primary class content data 128. The class data disclosed herein may be consistent with secondary class content data 136. The class data may include instructor image data. The instructor image data may be described further in detail with respect to FIG. 2. In some embodiments, the instructor image data may be stored in a fitness database. In some embodiments, the instructor image data may be retrieved from the fitness database. In some embodiments, an instructor camera 232 may be communicatively connected to a user device 220. The instructor camera 232 may transmit the instructor image data to the user device 220. In some embodiments, the instructor camera 232 may be communicatively connected to an instructor device 204 such as without imitation an instructor display device. The instructor camera 232 may transmit the instructor image data to the display of the instructor device 204. The instructor camera 232 disclosed herein is further described below. In an embodiment, the user device 220 may receive the class data from an instructor device 204. In another embodiment, the user device 220 may receive the class data from a fitness database. Additionally and without limitation, the instructor image data disclosed herein may be consistent with instructor data found in U.S. patent application Ser. No. 18/368,947, filed on Sep. 15, 2023, and entitled "AN APPARATUS FOR CLASS ADMINISTRATION AND A METHOD OF USE,", the entirety of which is incorporated by reference. Additionally and without limitation, the class data disclosed herein may be consistent with class action data found in U.S. patent application Ser. No. 18/368,867, the entirety of which is incorporated herein by reference. Additionally and without limitation, classes may be scheduled without limitation as disclosed in U.S. patent application Ser. No. 18/368,915, filed on Sep. 15, 2023, and entitled "APPARATUS FOR CLASSROOM SCHEDULING AND METHOD OF USE," the entirety of which is incorporated herein by reference.

With continued reference to FIG. 2, in another embodiment, a user device 220 may be configured to receive an instructor feedback. In some embodiments, the user device 220 is configured to display the instructor feedback. In some embodiments, the instructor feedback may be displayed on a display of a user output device of the user device 220. For the purposes of this disclosure, an "instructor feedback" is a feedback generated by an instructor for a user taking a fitness class provided by the instructor. The instructor feedback disclosed herein is further described below. In an embodiment, the instructor 236 may generate the instructor feedback as a function of user image data. As a non-limiting example, the instructor 236 may find from the user image data that a position of a user 108 is not correct and give the instructor feedback about the position. In another embodiment, the instructor 236 may generate the instructor feedback as a function of user action data. As a non-limiting example, the instructor 236 may find from the user action data that a weight distributed by the user 108 while taking the fitness class is not well distributed and the instructor 236 may give the instructor feedback to the user 108 about the weight distribution. As another non-limiting example, the instructor 236 may find from the user action data that a speed of the user 108 while taking the fitness class is not fast enough. As another non-limiting example, the instructor 236 may find from the user action data that the user 108 may need to work out harder in order to reduce body measurement value. In some embodiments, the instructor feedback may include audio, text, image, icon, and the like. As a non-limiting example, the instructor 236 may talk on a microphone to give audio instructor feedback. As another non-limiting example, the instructor 236 may touch a screen of a display of an instructor device 204 to give visual instructor feedback. For example and without limitation, when the instructor 236 wants to give visual instructor feedback to the user 108 about the position of the user 108 while taking the fitness class, the instructor 236 may touch a portion of the user 108's body that is not correct on the screen of the display of the instructor device 204, where the display is displaying a video of the user 108 taking the fitness class.

With continued reference to FIG. 2, in one or more embodiments, processor 120 may implement one or more aspects of "generative artificial intelligence (AI)," a type of AI that uses machine learning algorithms to create, establish, or otherwise generate data such as, without limitation, classroom data, instructor feedback, and/or the like in any data structure described herein (e.g., text, image, video, audio, among others) that is similar to one or more provided sets of training data. In an embodiment, machine learning module described herein may generate one or more generative machine learning models that are trained on one or more set of examples. One or more generative machine learning models may be configured to generate new examples that are similar to the training data of the one or more generative machine learning models but are not exact replicas; for instance, and without limitation, data quality or attributes of the generated examples may bear a resemblance to the training data provided to one or more generative machine learning models, wherein the resemblance may pertain to underlying patterns, features, or structures found within the provided training data.

Still referring to FIG. 2, in some cases, generative machine learning models may include one or more generative models. As described herein, "generative models" are statistical models of the joint probability distribution $P(X,Y)$ on a given observable variable x, representing features or data that can be directly measured or observed (e.g., video clips or images of user's poses and movements, sensor readings from wearable devices and/or plurality of sensors, time-series data representing sequence of poses or transitions, audio recordings of user's breathing patterns or verbal responses, and/or the like) and target variable y, representing the outcomes or labels that one or more generative models aims to predict or generate (e.g., instructor feedback, corrective instructions, guidance, error flags or annotations, supplementary content, and/or the like). In some cases, generative models may rely on Bayes theorem to find joint probability; for instance, and without limitation, Naïve Bayes classifiers may be employed by processor 120 to categorize input data such as, without limitation, yoga poses into different classes such as, without limitation, difficulty levels based on observable features described herein.

In a non-limiting example, and still referring to FIG. 2, one or more generative machine learning models may include one or more Naïve Bayes classifiers generated, by processor 120, using a Naïve bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)\ P(A)+P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction.

Still referring to FIG. 2, although Naïve Bayes classifier may be primarily known as a probabilistic classification algorithm; however, it may also be considered a generative model described herein due to its capability of modeling the joint probability distribution $P(X,Y)$ over observable variables X and target variable Y. In an embodiment, Naïve Bayes classifier may be configured to make an assumption that the features X are conditionally independent given class label Y, allowing generative model to estimate the joint distribution as $P(X,Y)=P(Y)\Pi iP(Xi|Y)$, wherein $P(Y)$ may be the prior probability of the class, and $P(X_i|Y)$ is the conditional probability of each feature given the class. One or more generative machine learning models containing Naïve Bayes classifiers may be trained on labeled training data, estimating conditional probabilities $P(X_i|Y)$ and prior probabilities $P(Y)$ for each class; for instance, and without limitation, using techniques such as Maximum Likelihood Estimation (MLE). One or more generative machine learning models containing Naïve Bayes classifiers may select a class label y according to prior distribution $P(Y)$, and for each feature $X_i$, sample at least a value according to conditional distribution $P(X_i|y)$. Sampled feature values may then be combined to form one or more new data instance with selected class label y. In a non-limiting example, one or more generative machine learning models may include one or more Naïve Bayes classifiers to generate new examples of yoga poses based on difficulty levels (e.g., beginner, intermediate, advanced), wherein the models may be trained using training data containing a plurality of features e.g., body alignment, balance, pose complexity, and/or the like as input correlated to a plurality of labeled classes e.g., difficulty levels as output.

Still referring to FIG. 2, in some cases, one or more generative machine learning models may include generative adversarial network (GAN). As used in this disclosure, a "generative adversarial network" is a type of artificial neural network with at least two sub models (e.g., neural networks), a generator, and a discriminator, that compete against each other in a process that ultimately results in the generator learning to generate new data samples, wherein the "generator" is a component of the GAN that learns to create hypothetical data by incorporating feedbacks from the "discriminator" configured to distinguish real data from the hypothetical data. In some cases, generator may learn to make discriminator classify its output as real. In an embodiment, discriminator may include a supervised machine learning model while generator may include an unsupervised machine learning model as described in further detail with reference to FIG. 4.

With continued reference to FIG. 2, in an embodiment, discriminator may include one or more discriminative models, i.e., models of conditional probability $P(Y|X=x)$ of target variable Y, given observed variable X. In an embodiment, discriminative models may learn boundaries between classes or labels in given training data. In a non-limiting example, discriminator may include one or more classifiers as described in further detail below with reference to FIG. 4 to distinguish between different categories e.g., real vs. fake, or states e.g., TRUE vs. FALSE within the context of generated data such as, without limitations, yoga poses, yoga instructions, and/or the like. In some cases, processor 120 may implement one or more classification algorithms such as, without limitation, Support Vector Machines (SVM), Logistic Regression, Decision Trees, and/or the like to define decision boundaries.

In a non-limiting example, and still referring to FIG. 2, generator of GAN may be responsible for creating synthetic data that resembles real yoga instruction content. In some cases, GAN may be configured to receive user action data such as, without limitation, one or more video clips of one or more users, as input and generates corresponding instruction texts or even supplementary videos containing information describing or evaluating the performance of one or more poses shown in each of the received video clips. On the other hand, discriminator of GAN may evaluate the authenticity of the generated content by comparing it to real yoga instruction data, for example, discriminator may distinguish between genuine and generated content and providing feedback to generator to improve the model performance.

With continued reference to FIG. 2, in other embodiments, one or more generative models may also include a variational autoencoder (VAE). As used in this disclosure, a "variational autoencoder" is an autoencoder (i.e., an artificial neural network architecture) whose encoding distribution is regularized during the model training process in order to ensure that its latent space includes desired properties allowing new data sample generation. In an embodiment, VAE may include a prior and noise distribution respectively, trained using expectation-maximization meta-algorithms such as, without limitation, probabilistic PCA, sparse coding, among others. In a non-limiting example, VEA may use a neural network as an amortized approach to jointly optimize across input data and output a plurality of parameters for corresponding variational distribution as it maps from a known input space to a low-dimensional latent space. Additionally, or alternatively, VAE may include a second neural network, for example, and without limitation, a decoder, wherein the "decoder" is configured to map from the latent space to the input space.

In a non-limiting example, and still referring to FIG. 1, VAE may be used by processor 120 to model complex relationships between user action data e.g., different poses, movements, and alignments. In some cases, VAE may encode input data into a latent space, capturing essential characteristics of user's poses and movements. Such encoding process may include learning one or more probabilistic mappings from observed user action data to a lower-dimensional latent representation. Latent representation may then be decoded back into the original data space, therefore reconstructing the observed user actions. In some cases, such decoding process may allow VAE to generate new examples or variations that are consistent with the learned distributions.

With continued reference to FIG. 2, in some embodiments, one or more generative machine learning models may be trained on a plurality of video clips of users performing various poses and actions as described herein, wherein the plurality of video clips may provide visual information that generative machine learning models analyze to understand the dynamics of yoga movements. In other embodiments, training data may also include voice-over instructions and feedback from instructors. In some cases, such data may help generative machine learning models to learn appropriate language and tone for providing instructions/guidance on various yoga poses and/or movements. Additionally, or alternatively, one or more generative machine learning models may utilize one or more predefined templates representing, for example, and without limitation, correct yoga poses. In a non-limiting example, one or more movement templates (i.e., predefined models or representations of correct and ideal physical movements, poses, or actions associated with specific yoga practices) may serve as benchmarks for comparing and evaluating plurality of video clips containing user's movement.

Still referring to FIG. 2, processor 120 may configure generative machine learning models to analyze input data such as, without limitation, video clips or other user action data and compare input data to one or more predefined templates such as movement templates representing correct yoga poses described above, thereby allowing processor 120 to identify discrepancies or deviations from the ideal form. In some cases, processor 120 may be configured to pinpoint specific errors in alignment, posture, balance, timing, or any other aspects of the user action. In a non-limiting example, processor 120 may be configured to implement generative machine learning models to incorporate additional models to detect a misaligned spine, an incorrect angle of a joint, or an improper transition between a first pose and a second pose. In some cases, errors may be classified into different categories or severity levels. In a non-limiting example, some errors may be considered minor, and generative machine learning model such as, without limitation, GAN may be configured to generate instructions contain only slight adjustments while others may be more significant and demand more substantial corrections. In some embodiments, processor 120 may be configured to flag or highlight poses that are performed incorrectly, altering the instructor or user to areas that need attention, directly on the video clip using one or more generative machine learning models described herein. In some cases, one or more generative machine learning models may be configured to generate and output indicators such as, without limitation, visual indicator, audio indicator, and/or any other indicators as described above. Such indicators may be used to signal the detected error described herein.

With continued reference to FIG. 2, in a non-limiting example, processor 120 may be configured to handle a group setting, for example, and without limitation, a yoga class may include a plurality of participants (i.e., users). In such embodiment, processor 120 may be configured to detect, using computer vision model described above, commonalities of deficiencies (i.e., errors) in movements among plurality of users, as compared to predefined "ideal" movements or poses (i.e., movement template). Computer vision model and/or one or more machine learning models described herein may be configured to perform pose detection, and analyze alignment, balance, and other key aspects of each detected pose. In some cases, one or more skeletal representations, each corresponding to each individual user of plurality of users, may be formed using computer vision model by connecting a plurality of points based on anatomical structure identified based on visual data such as, without limitation, a video clip of a group session. Computer vision model may use pairwise relations and graph algorithms to determine connections based on known relationships between joints e.g., knee connected to hip to construct a coherent skeleton. In some cases, processor 120 may be configured to identify and rank detected common deficiencies across plurality of users; for instance, and without limitation, one or more machine learning models may classify errors in a specific order e.g., a descending order of commonality. Such ranking process may enable a prioritization of most prevalent issues, allowing instructors or processor 120 to address the widespread challenges first. In a non-limiting example, if 80% of participants are struggling with a specific alignment in a particular pose, that issue may be detected and targeted with corrective instructions or demonstrations generated by one or more generative machine learning models.

Still referring to FIG. 2, in some cases, one or more generative machine learning models may also be applied by processor 120 to edit, modify, or otherwise manipulate existing data or data structures. In an embodiment, output of training data used to train one or more generative machine learning models such as GAN as described herein may include textual instructions or supplementary videos that linguistically or visually demonstrate modified user action data e.g., guidance to adjust specific body parts, corrected alignment or execution of the pose, and/or the like. In some cases, supplementary videos may be synchronized with the user's performance, for example, and without limitation, in a side-by-side or even overlayed arrangement with the input user action data, providing real-time visual guidance. Additionally, or alternatively, voice-over guidance may be generated using generative machine learning models to verbally guide users through the corrections. In some cases, such auditory feedback may be integrated with the supplementary videos, offering user a multisensory instructional experience.

Additionally, or alternatively, and still referring to FIG. 2, processor 120 may be configured to continuously monitor user action data. In an embodiment, processor 120 may configure discriminator to provide ongoing feedback and further corrections as needed to subsequent input data (e.g., video clips or other data related to user's movements and poses during a yoga session). In some cases, one or more sensors such as, without limitation, wearable device, motion sensor, or other sensors or devices described herein may provide additional user action data that may be used as subsequent input data or training data for one or more generative machine learning models described herein. An iterative feedback loop may be created as processor 120 continuously receive real-time data, identify errors as a function of real-time data, delivering corrections based on the identified errors, and monitoring user responses on the delivered corrections. In an embodiment, processor 120 may be configured to retrain one or more generative machine learning models based on user responses or update training data of one or more generative machine learning models by integrating user response into the original training data. In such embodiment, iterative feedback loop may allow machine learning module to adapt to the user's needs and performance, enabling one or more generative machine learning models described herein to learn and update based on user responses and generated feedback.

With continued reference to FIG. 2, other exemplary embodiments of generative machine learning models may include, without limitation, long short-term memory networks (LSTMs), (generative pre-trained) transformer (GPT) models, mixture density networks (MDN), and/or the like. As an ordinary person skilled in the art, upon reviewing the entirety of this disclosure, will be aware of various generative machine learning models may be used to generate and/or modify user action data, class data, instructor feedback, and/or any other data described herein.

Still referring to FIG. 2, in a further non-limiting embodiment, machine learning module may be further configured to generate a multi-model neural network that combines various neural network architectures described herein. In a non-limiting example, multi-model neural network may combine LSTM for time-series analysis with GPT models for natural language processing. Such fusion may be applied by processor 120 to generate real-time instructor feedback in yoga class setting. In some cases, multi-model neural network may also include a hierarchical multi-model neural network, wherein the hierarchical multi-model neural network may involve a plurality of layers of integration; for instance, and without limitation, different models may be combined at various stages of the network. Convolutional neural network (CNN) may be used for image feature extraction, followed by LSTMs for sequential pattern recognition, and a MDN at the end for probabilistic modeling. Other exemplary embodiments of multi-model neural network may include, without limitation, ensemble-based multi-model neural network, cross-modal fusion, adaptive multi-model network, among others. As an ordinary person skilled in the art, upon reviewing the entirety of this disclosure, will be aware of various generative machine learning models may be used to generate and/or modify user action data, class data, instructor feedback, and/or any other data described herein. As an ordinary person skilled in the art, upon reviewing the entirety of this disclosure, will be aware of various multi-model neural network and combination thereof that may be implemented by apparatus 200 in consistent with this disclosure.

With continued reference to FIG. 2, in some embodiments, a user device 220 may use a user interface displaying class data. For the purposes of this disclosure, a "user interface" is a means by which a user and/or an instructor and a computer system interact; for example through the use of input devices and software. A user interface may include a graphical user interface (GUI), command line interface (CLI), menu-driven user interface, touch user interface, voice user interface (VUI), form-based user interface, any combination thereof and the like. In some embodiments, user interface may operate on and/or be communicatively connected to a decentralized platform, metaverse, and/or a decentralized exchange platform associated with the user. For example, the user 108 and/or the instructor 236 may interact with user interface in virtual reality. In some embodiments, the user 108 and/or the instructor 236 may interact with the use interface using a computing device distinct from and communicatively connected to a user device 220. In an embodiment, user interface may include a graphical user interface. A "graphical user interface," as used herein, is a graphical form of user interface that allows users and instructors to interact with electronic devices. In some embodiments, GUI may include icons, menus, other visual indicators, or representations (graphics), audio indicators such as primary notation, and display information and related user controls. A menu may contain a list of choices and may allow users to select one from them. A menu bar may be displayed horizontally across the screen such as pull down menu. When any option is clicked in this menu, then the pull down menu may appear. A menu may include a context menu that appears only when the user performs a specific action. An example of this may include pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access. Using an icon may be a fast way to open documents, run programs etc. because clicking on them yields instant access. Information contained in user interface may be directly influenced using graphical control elements such as widgets. A "widget," as used herein, is a user control element that allows a user and an instructor to control and change the appearance of elements in the user interface. In this context a widget may refer to a generic GUI element such as a check box, button, or scroll bar to an instance of that element, or to a customized collection of such elements used for a specific function or application such as without limitation a dialog box for the users 108 and/or the instructors 236 to customize their computer screen appearances. User interface controls may include software components that a user interacts with through direct manipulation to read or edit information displayed through user interface. Widgets may be used to display lists of similar items, navigate the system using links, tabs, and manipulate data using check boxes, radio boxes, and the like.

With continued reference to FIG. 2, in an embodiment, a user device 220 may include a computing device. The computing device disclosed herein may be consistent with any computing device found in the entirety of this disclosure. The computing device may include at least a processor.

With continued reference to FIG. 2, in another embodiment, a user device 220 may include a user personal device. For the purposes of this disclosure, a "user personal device" is any device personally owned by a user. A user 108 may have a capability to process, store or transmit any information independently. As a non-limiting example, the user personal device may include a smartphone, laptop, tablet, smart watch, and the like.

With continued reference to FIG. 2, in some embodiments, a user device 220 may include a user output device. For the purposes of this disclosure, "user output device" is a device that outputs information to a user. In some embodiments, the user output device may be incorporated wholly or in part in the user device 220; for instance, The user output device may include a display and speakers of a smartphone of a user personal device. The user output device may be coupled directly to the user device 220 or may communicated with the user device 220 using a network; The user output device may be incorporated in or include user device 220, a computing device and/or any element thereof, using wireless or wired communication. In some embodiments, the user output device may be configured to output a class data, instructor feedback, and the like. The class data and the instructor feedback disclosed herein are further described below.

With continued reference to FIG. 2, in an embodiment, a user output device may include a display. The display may include a first display 112 and a second display 116. The first display 112 and the second display 116 disclosed herein are further described above. The display may be configured to provide a way for a user 108 to view and/or interact with an instructor 236 with information, including but not limited to class data, instructor feedback, and/or the like. The class data and the instructor feedback disclosed herein are further described below. In some embodiments, the display may be implemented in any user device 220 disclosed in the entirety of this disclosure. The display may be implemented on any user device 220 disclosed in the entirety of this disclosure.

With continued reference to FIG. 2, in another embodiment, a user output device may include an audio device. For the purposes of this disclosure, an "audio device" is a device that outputs audio information or data. As a non-limiting example, the audio device may include a speaker. For the purposes of this disclosure, a "speaker" is a device that converts electrical signals into sound waves that can be heard by the human ear. In some embodiments, the speaker may output the instructor feedback to a user 108.

With continued reference to FIG. 2, in some embodiments, a user device 220 may include a microphone. For the purposes of this disclosure, a "microphone" is a device that converts sound waves into electrical signals. The microphone may be a type of transducer that is used to capture audio signals and convert them into an electrical form that can be amplified, recorded, or transmitted to other devices. In some embodiments, an instructor 236 may input an instructor feedback using the microphone.

With continued reference to FIG. 2, in another embodiment, a user device 220 may include a virtual reality (VR) device. For the purposes of this disclosure, "virtual reality device" is an artificial computer-generated environment that simulates a three-dimensional space or world, which can be experienced by a user or an instructor as if the user or the instructor were actually there. The virtual reality device may be implemented in any suitable user device 220 disclosed in the entirety of this disclosure. As a non-limiting example, the user device 220 may include a virtual reality in a headset of a wearable device. The virtual reality device may alternatively or additionally be implemented using a first display 112 and/or second display 116, which may display user image data, instructor image data, instructor feedback, and the like, as described in further detail below. Persons skilled in the art, upon reviewing the entirety of this disclosure, will be aware of various optical projection and/or display technologies that may be incorporated in virtual reality device consistently with this disclosure.

With continued reference to FIG. 2, in an embodiment, a virtual reality device of a user device 220 may display a user avatar to a user 108. For the purposes of this disclosure, an "user avatar" is a virtual avatar of a user. In another embodiment, the virtual reality device of the user device 220 may display a third-party avatar to the user 108. For the purposes of this disclosure, an "third-party avatar" is a virtual avatar of a third party. For the purposes of this disclosure, "third party" is a person taking a fitness class other than a user that is taking the fitness class. In another embodiment, the virtual reality device of the user device 220 may display an instructor avatar to the user 108. For the purposes of this disclosure, an "instructor avatar" is a virtual avatar of an instructor.

With continued reference to FIG. 2, a "virtual avatar" as used in this disclosure is any digital creation displayed through a screen. Digital creations may include, but are not limited to, digital entities, virtual objects, and the like. The virtual avatar may be a visual representation of a user 108, an instructor 236, and/or a third party. The virtual avatar may include, without limitation, two-dimensional representations of animals and/or human characters, three-dimensional representations of animals and/or human characters, and the like. For instance and without limitation, the virtual avatar may include penguins, wolves, tigers, frogs, young human characters, old human characters, middle-aged human characters, and the like. In some embodiments, the virtual avatar may include clothing, apparel, and/or other items. Clothing may include, but is not limited to, jackets, pants, shirts, shorts, suits, ties, and the like. Apparel may include, but is not limited to, skis, ski goggles, baseball mitts, tennis rackets, suitcases, and the like. The virtual avatar may be generated as a function of user image data and/or instructor image data. For instance and without limitation, a user device 220 and/or instructor device 204 may generate a user avatar that corresponds to a user 108. For instance and without limitation, the user device 220 and/or instructor device 204 may generate a third-party avatar that corresponds to a third party. For instance and without limitation, the user device 220 and/or instructor device 204 may generate an instructor avatar that corresponds to an instructor 236.

With continued reference to FIG. 2, in some embodiments, a user device 220 may include an augmented reality (AR) device. An "augmented reality device," as used in this disclosure, is a device that permits a user or an instructor to view a typical field of vision of the user or the instructor and superimposes virtual images on the field of vision. The augmented reality device may be implemented in any suitable user device 220 disclosed in the entirety of this disclosure. As a non-limiting example, the user device 220 may include an augmented reality in a mobile phone of a user personal device. As another non-limiting example, the user device 220 may include an augmented reality in a smart watch of the user personal device. The augmented reality device may alternatively or additionally be implemented using a first display 112 and/or second display 116, which may display user image data, instructor image data, instructor feedback, and the like, as described in further detail below. In an embodiment, the augmented reality device of the user device 220 may display a user avatar to a user 108. In another embodiment, the augmented reality device of the user device 220 may display a third-party avatar to the user 108. In another embodiment, the augmented reality device of the user device 220 may display an instructor avatar to the user 108.

With continued reference to FIG. 1, in some cases, AR device may be configured to receive a view feed. As used in this disclosure, a "view feed" refers to a real-time visual data obtained from AR device as the user navigates and interacts with the physical environment. In a non-limiting example, view feed may represent user's perspective and field of view. Capturing view feed may include capturing the surrounding environment, objects, any relevant spatial information, and/or the like of the user. In an embodiment, view feed may serve as a foundation for AR device, wherein view feed may provide visual data to align, anchor, or otherwise render digital content onto the user's view of the real world. In some cases, view feed may be utilized for various image processing, computer vision, and/or machine learning tasks, such as, without limitation, object recognition, spatial mapping, user's position and/or movement tracking, and/or the like described herein.

With continued reference to FIG. 1, AR device may include a view window. A "view window," for the purpose of this disclosure, is a portion of the AR device that permits a user to observe a view of a field of vision; view window may include a transparent window, such as a transparent portion of goggles such as lenses or the like. Additionally, or alternatively, view window may include a screen that displays a field of vision to a user. In some embodiments, AR device may include a projection device, defined as a device that inserts an image into a field of vision. Where view window includes a screen, projection device may include a software and/or hardware component that adds an inserted graphic into a signal to be rendered on the screen. Projection device and/or view window may make use of reflective waveguides, diffractive waveguides, or the like to transmit, project, and/or display graphics. For instance, and without limitation, projection device may project images through and/or reflect images off an eyeglass-like structure and/or lens piece, where either both field of vision and images from projection device may be so displayed, or the former may be permitted to pass through a transparent surface. Projection device and/or view window may be incorporated in a contact lens or eye tap device, which may introduce images into light entering an eye to cause display of such images. Projection device and/or view window may display some images using a virtual retina display (VRD), which may display an image directly on a retina of a user.

With continued reference to FIG. 1, AR device may be implemented in any suitable way, including without limitation incorporation of or in a head mounted display, a head-up display, a display incorporated in eyeglasses, googles, headsets, helmet display systems, or the like, a display incorporated in contact lenses, an eye tap display system including without limitation a laser eye tap device, VRD, or the like. Persons skilled in the art, upon reviewing the entirety of this disclosure, will be aware of various optical projection and/or display technologies that may be incorporated in AR device consistently with this disclosure.

With continued reference to FIG. 1, view window, projection device, and/or other display devices incorporated in AR device may implement a stereoscopic display. A "stereoscopic display," as used in this disclosure, is a display that simulates a user experience of viewing a three-dimensional (3D) space and/or object, for instance by simulating and/or replicating different perspectives of a user's two eyes; this is in contrast to a two-dimensional image, in which images presented to each eye are substantially identical, such as may occur when viewing a flat screen display. Stereoscopic display may display two flat images having different perspectives, each to only one eye, which may simulate the appearance of an object or space as seen from the perspective of that eye. Alternatively, or additionally, stereoscopic display may include a three-dimensional display such as a holographic display or the like. Persons skilled in the art, upon reviewing the entirety of this disclosure, will be aware of various alternative or additional types of stereoscopic display that may be employed in AR device.

With continued reference to FIG. 1, AR device may include a field camera. A "field camera," as used in this disclosure, is an optical device, or combination of optical devices, configured to capture a field of vision as an electrical signal, to form a digital image. Field camera may include a single camera and/or two or more cameras used to capture a field of vision; for instance, and without limitation, the two or more cameras may capture two or more perspectives for use in stereoscopic and/or three-dimensional display, as described above. Field camera may capture a feed including a plurality of frames, such as without limitation a video feed.

With continued reference to FIG. 2, in some embodiments, a user device 220 may be configured to generate an analytic feedback as a function of user image data and instructor image data and display the analytic feedback to a user 108. In some embodiments, the analytic feedback may be displayed on a second display 116. For the purposes of this disclosure, an "analytic feedback" is a feedback that is generated by comparing user image data and instructor image data. As a non-limiting example, the user device 220 may compare an image of a plurality of images of the user 108 of the user image data and an image of a plurality of images of an instructor 236 of the instructor image data. The user device 220 may compare a position of the user 108's body and a position of the instructor 236's body and find a portion of the user's 116 body that does not match with the instructor 236's body. The user device 220 may display the portion of the user's 116 body that does not match with the position of the instructor 236's body. In some embodiments, the analytic feedback may include audio, image, icon, video, light, pressure, and the like. As a non-limiting example, the analytic feedback may be displayed on a display of a user output device of the user device 220. As another non-limiting example, the analytic feedback may be displayed on an audio device of the user output device of the user device 220. As another non-limiting example, a US equipment 208 may be configured to display the analytic feedback to the user 108. For example without limitation, a light indicator of the US equipment 208 may indicate the analytic feedback to the user 108 by lighting the portion of the user's 116 body that does not match with the instructor 236's body position. For another example without limitation, a pressure indicator of the US equipment 208 may indicate the analytic feedback to the user 108 by putting pressure to the portion of the user's 116 body that does not match with the instructor 236's body position. For another example without limitation, a vibration indicator of the US equipment 208 may indicate the analytic feedback to the user 108 by vibrating the vibration indicator near the portion of the user's 116 body that does not match with the instructor 236's body position.

With continued reference to FIG. 2, in some embodiments, an instructor device 204 may be configured to display an analytic feedback to an instructor 236. As a non-limiting example, a display of an instructor output device 240 of the instructor device 204 may display the analytic feedback to the instructor 236. The instructor device 204 disclosed herein is further described below. As another non-limiting example, the analytic feedback may be displayed on an audio device of the user output device of the user device 220. In some embodiments, an instructor smart (IS) equipment 216 may be configured to display the analytic feedback to the instructor 236. The instructor smart equipment 216 disclosed herein is further described below. For example without limitation, a light indicator of the IS equipment 216 may indicate the analytic feedback to the instructor 236 by lighting the light indicator that is close to the portion of the instructor's 132 body that is same as the portion of the user 108's that does not match with the instructor 236's body position. For another example without limitation, a pressure indicator of the IS equipment 216 may indicate the analytic feedback to the instructor 236 by putting pressure using the pressure indicator that is close to the portion of the instructor's 132 body that is same as the portion of the user 108's that does not match with the instructor 236's body position. For another example without limitation, a vibration indicator of the IS equipment 216 may indicate the analytic feedback to the user 108 by vibrating the vibration indicator near the portion of the instructor's 132 body that is same as the portion of the user 108's that does not match with the instructor 236's body position.

With continued reference to FIG. 2, a fitness classroom assembly 100 includes an instructor device 204. For the purposes of this disclosure, "instructor device" is a device that an instructor uses for a fitness class. In some embodiments, an instructor 236 may provide a fitness class to a user 108 using the instructor device 204. In some embodiments, the instructor device 204 is configured to transmit class data to a user device 220. In an embodiment, the class data may include instructor image data. The instructor image data disclosed herein is further described above. The instructor image data may be consistent with image data disclosed above. In some embodiments, the instructor image data may be generated using an instructor camera 232. For the purposes of this disclosure, an "instructor camera" is a camera that an instructor uses to generate instructor image data. The instructor image data includes a plurality of images of the instructor 236. The instructor device 204 may include the instructor camera 232. In some embodiments, the instructor camera 232 may be in various place from various angles. As a non-limiting example, the instructor camera 232 may be overhead, front, back, any sides of the instructor 236. In some embodiments, the instructor camera 232 128 may include a plurality of cameras generating instructor image data with multiple angles of the instructor 236. The instructor camera 232 disclosed herein may be consistent with a camera disclosed above. The instructor camera 232 may be implemented on any instructor devices disclosed in the entirety of this disclosure.

With continued reference to FIG. 2, in some embodiments, class data may include a class feedback. For the purposes of this disclosure, a "class feedback" is a feedback that is generated for a fitness class by an instructor, where the feedback is not specific to a particular user. The class feedback may not be interactive as the instructor feedback. The class feedback may include visual, audio, pressure, icon feedback, and the like. As a non-limiting example, the class feedback may include an encouragement generated by an instructor 236 for a user 108. As another non-limiting example, the class feedback may include an instruction. For example and without limitation, the instruction may include instructions related to exercise position, which part of a body to focus, amount of time to do the exercise for the fitness class, any information about the fitness class. Additionally and without limitation, the class feedback disclosed herein may be consistent with instructions data found in U.S. patent application Ser. No. 18/368,947, filed on Sep. 15, 2023, and entitled "AN APPARATUS FOR CLASS ADMINISTRATION AND A METHOD OF USE,", the entirety of which is incorporated by reference.

With continued reference to FIG. 2, in another embodiment, an instructor device 204 is configured to display user image data to an instructor 236. As a non-limiting example, the instructor device 204 may receive the user image data from user camera 228. In some embodiments, the instructor device may include instructor output device 240. For the purposes of this disclosure, "instructor output device" is a device that outputs information to an instructor. In some embodiments, the instructor output device 240 may be incorporated wholly or in part in the instructor device 204; for instance, The instructor output device 240 may include a display and speakers of a smartphone of an instructor personal device. The instructor output device 240 may be coupled directly to the instructor device 204 or may communicated with the instructor device 204 using a network; The instructor output device 240 may be incorporated in or include instructor device 204, a computing device and/or any element thereof, using wireless or wired communication. In some embodiments, the instructor output device 240 may be configured to output user image data, user action data, and the like. The user image data and the user action data disclosed herein are further described above.

With continued reference to FIG. 2, in an embodiment, an instructor output device 240 may include a display. The display disclosed herein is further described above. The display of the instructor output device 240 disclosed herein may be consistent with a display of a user device 220. As a non-limiting example, the display may present visual information or data in one or more forms of text, graphics, images, video, and the like. The display may be configured to provide a way for an instructor 236 to view and/or interact with a user 108 with information, including but not limited to class data, instructor feedback, and/or the like. In some embodiments, the display may be implemented in any instructor device 204 disclosed in the entirety of this disclosure. In some embodiments, the display may include different technologies, such as liquid crystal display (LCD,) a light-emitting diode (LED,) organic light-emitting diode (OLED,) plasma, projection, touch screen, and/or the like. In some embodiments, the display may include varying resolutions, sizes, and aspect ratios. In some embodiments, the display may include a monitor, phone screen, laptop screen, tablet screen, a smart mirror, a smart watch, a headset screen, a virtual reality screen, an augmented reality screen, and the like. The display may be implemented on any instructor device 204 disclosed in the entirety of this disclosure. In another embodiment, the instructor output device 240 may include an audio device. The audio device disclosed herein is further described above. As a non-limiting example, the audio device may include a speaker.

With continued reference to FIG. 2, in another embodiment, an instructor device 204 is configured to display user action data to an instructor 236. As a non-limiting example, the instructor device 204 may receive the user action data from a UE sensor 224 of a US equipment 208. In an embodiment, the user action data may be displayed on a display of an instructor output device 240 of the instructor device 204. Then, the instructor 236 may generate an instructor feedback according to the user action data. In another embodiment, the user action data may be displayed on an instructor smart (IS) equipment 216. For the purposes of this disclosure, "instructor smart equipment" IS equipment 216 that operates interactively with an instructor. In an embodiment, the IS equipment 216 may be installed on a surface of ground, wall, ceiling, and the like. In another embodiment, the IS equipment 216 may be portable. In an embodiment, the IS equipment 216 may include a smart mat. In another embodiment, the IS equipment 216 may include a wearable device. The smart mat and the wearable device disclosed herein are further described above. In some embodiments, the IS equipment 216 may receive an instructor feedback from the instructor 236 and transmit the instructor feedback to a user 108.

With continued reference to FIG. 2, in some embodiments, IS equipment 216 may include at least an instructor equipment (IE) sensor 212. For the purposes of this disclosure, an "instructor equipment sensor" is a sensor for an instructor smart equipment. The IE sensor 212 may include any sensors disclosed in the entirety of this disclosure. As a non-limiting example, the IE sensor 212 may include temperature sensor, force sensor, moisture sensor, motion sensor, biosensor, and the like. In some embodiments, the at least an IE sensor 212 may be communicatively connected to the IS equipment 216. The IE sensor 212 may be consistent with a UE sensor 224. The at least an IE sensor 212 may output a sensed signal. As a non-limiting example, the sensed signal of at least an IE sensor 212 may include instructor action data. For the purposes of this disclosure, "instructor action data" is data related to instructor's motion and any phenomenon resulted by the instructor's motion. In some embodiments, the instructor action data may be stored in a fitness database. In some embodiments, an instructor 236 may manually input instructor action data using an instructor device 204 such as without limitation a mobile phone, a laptop, a tablet, and the like. In some embodiments, the instructor action data may be retrieved from the fitness database. In some embodiments, the at least an IE sensor 212 may transmit the instructor action data to a user device 220. In some embodiments, the instructor action data may be displayed on a second display 116 of a fitness classroom 104. As a non-limiting example, the instructor action data that may include weight distribution of an instructor 236 during an exercise may be displayed on the second display 116 to the user 108. For the purposes of this disclosure, "weight distribution" is distribution of human body weight on a specific body part of the human body for a specific purpose such as but not limited to an exercise. In an embodiment, the weight distribution of the instructor 236 may be detected using IE sensor 212 of a smart mat of IS equipment 216. For example and without limitation, when the instructor 236 puts the instructor 236's weight onto a left foot during a specific exercise, a force sensor of the IE sensor 212 of the smart mat of the IS equipment 216 may detect the weight distribution of the instructor 236. In another embodiment, the weight distribution of the instructor 236 may be detected using the IE sensor 212 of a wearable device of the IS equipment 216. For example and without limitation, when the instructor 236 puts the instructor 236's weight onto a left arm during a specific exercise, a force sensor of the IE sensor 212 of the wearable device of the IS equipment 216 may detect the weight distribution of the instructor 236. As another non-limiting example, the instructor action data that may include speed of the instructor 236's legs during the exercise may be displayed on the second display 116 to the user 108. In some embodiments, the at least a UE sensor 224 may be communicatively connected to a user device 220. In some embodiments, the at least an IE sensor 212 may be communicatively connected to a user device 220.

With continued reference to FIG. 2, as a non-limiting example, instructor action data may include instructor temperature data, instructor force data, instructor moisture data, instructor motion data, instructor biometric data, and the like. For the purposes of this disclosure, "instructor temperature data" is data from a temperature sensor of at least an IE sensor 212. As a non-limiting example, the instructor temperature data may include a temperature of an instructor 236's body during a fitness class. For the purposes of this disclosure, "instructor force data" is data from a force sensor of at least an IE sensor 212. As a non-limiting example, the instructor force data may include a force an instructor 236 exerted on different parts of instructor smart equipment 208 such as but not limited to a smart mat, wearable device, and the like. For the purposes of this disclosure, "instructor moisture data" is data from a moisture sensor of at least an IE sensor 212. As a non-limiting example, the instructor moisture data may include amount of sweat of an instructor 236. For the purposes of this disclosure, "instructor motion data" is data from a motion sensor of at least an IE sensor 212. As a non-limiting example, the instructor motion data may include how fast an instructor 236 move arms, legs, or any parts of the instructor 236's body. As another non-limiting example, the instructor motion data may include acceleration or deceleration of an instructor 236's body movement. For the purposes of this disclosure, "instructor biometric data" is data from a biometric sensor of at least an IE sensor 212. As a non-limiting example, the user biometric data may include instructor 236's blood pressure during the fitness class. As another non-limiting example, the instructor biometric data may include instructor 236's heart rate during the fitness class. As another non-limiting example, the instructor biometric data may include measurements of an instructor 236's body. Persons skilled in the art, upon reviewing the entirety of this disclosure, will be aware of various instructor action data from the at least an IE sensor 212 that may be used consistently with this disclosure.

With continued reference to FIG. 2, in another embodiment, an instructor device 204 is configured to receive an instructor feedback from the instructor 236. The instructor feedback disclosed herein is further described above. In an embodiment, the instructor device 204 may receive the instructor feedback from a display of an instructor output device 240 of the instructor device 204 using a user interface. The user interface disclosed herein is further described above. A user interface may include a graphical user interface (GUI), command line interface (CLI), menu-driven user interface, touch user interface, voice user interface (VUI), form-based user interface, any combination thereof and the like. In some embodiments, the user 108 and/or the instructor 236 may interact with the use interface using a computing device distinct from and communicatively connected to an instructor device 204. In an embodiment, user interface may include a graphical user interface. In some embodiments, GUI may include icons, menus, other visual indicators or representations (graphics), audio indicators such as primary notation, and display information and related user controls. A menu may contain a list of choices and may allow an instructor 236 to select one from them. User interface controls may include software components that the instructor 236 interacts with through direct manipulation to read or edit information displayed on the display of the instructor device 204 through user interface.

With continued reference to FIG. 2, in another embodiment, an instructor device 204 may receive the instructor feedback from a microphone. The microphone disclosed herein is further described above. In some embodiments, the instructor device 204 may receive the instructor feedback from an IS equipment 216. As a non-limiting example, the instructor device 204 may receive the instructor feedback from at least an IE sensor 212 of an IS equipment 216. For example and without limitation, the instructor feedback may include instructor action data. The instructor action data disclosed herein is further described above.

With continued reference to FIG. 2, in some embodiments, an instructor device 204 is configured to transmit an instructor feedback to a user device 220. As a non-limiting example, the instructor device 204 may transmit the instructor feedback to a display of a user output device of the user device 220. As a non-limiting example, the instructor device 204 may transmit the instructor feedback to an audio device of the user output device of the user device 220. In some embodiments, the instructor device 204 may transmit the instructor feedback to a US equipment 208. As a non-limiting example, the instructor device 204 may transmit the instructor feedback to an indicator of the US equipment 208.

With continued reference to FIG. 2, in some embodiments, an IS equipment 216 may include an indicator. The indicator disclosed herein is further described above. The indicator of the IS equipment 216 may be consistent with an indicator of a US equipment 208. In an embodiment, the indicator may be mechanically coupled on the IS equipment 216. In an embodiment, an indicator may include a light indicator. The light indicator disclosed herein is further described above. As a non-limiting example, the light indicator may indicate which portion of the IS equipment 216 an instructor 236 has to put more weight by lighting the portion of the IS equipment 216. As another non-limiting example, the light indicator may indicate which portion of the IS equipment 216 the instructor 236 has to change a body position by lighting the portion of the IS equipment 216. In another embodiment, the indicator may include a sound indicator. The sound indicator disclosed herein is further described above. As a non-limiting example, the indicative sound may indicate that a position of a user 108 is not correct. As another non-limiting example, the indicative sound may indicate the user 108 asked for help. In another embodiment, the indicator may include a vibration indicator. The vibration indicator disclosed herein is further described above. In another embodiment, the indicator may include a pressure indicator. For the purposes of this disclosure, a "pressure indicator" is an indicator that indicates information using pressure. The pressure indicator disclosed herein is further described above.

With continued reference to FIG. 2, in some embodiments, an instructor device 204 may include a computing device. The computing device disclosed herein may be consistent with any computing device found in the entirety of this disclosure. In another embodiment, the instructor device 204 may include an instructor personal device. The instructor personal device disclosed herein may be consistent with a user personal device. For the purposes of this disclosure, an "instructor personal device" is any device personally owned by an instructor. The instructor 236 may have a capability to process, store or transmit any information independently. As a non-limiting example, the instructor personal device may include a smartphone, laptop, tablet, smart watch, and the like.

With continued reference to FIG. 2, in another embodiment, an instructor device 204 may include a virtual reality (VR) device. The virtual reality device disclosed herein is further described above. The virtual reality device may be implemented in any suitable instructor device 204 disclosed in the entirety of this disclosure. As a non-limiting example, the user device 220 may include a virtual reality in a headset of a wearable device. The virtual reality device may alternatively or additionally be implemented using a display, which may display user image data, instructor image data, instructor feedback, and the like, as described in further detail below. Persons skilled in the art, upon reviewing the entirety of this disclosure, will be aware of various optical projection and/or display technologies that may be incorporated in virtual reality device consistently with this disclosure.

With continued reference to FIG. 2, in an embodiment, a virtual reality device of an instructor device 204 may display a user avatar to an instructor 236. In another embodiment, the virtual reality device of the instructor device 204 may display a third-party avatar to the instructor 236. In another embodiment, the virtual reality device of instructor device 204 may display an instructor avatar to the instructor 236. The virtual avatar may be generated as a function of user image data and/or instructor image data. For instance and without limitation, a user device 220 and/or instructor device 204 may generate a user avatar that corresponds to a user 108. For instance and without limitation, the user device 220 and/or instructor device 204 may generate a third-party avatar that corresponds to a third party. For instance and without limitation, the user device 220 and/or instructor device 204 may generate an instructor avatar that corresponds to an instructor 236.

With continued reference to FIG. 2, in some embodiments, an instructor device 204 may include an augmented reality (AR) device. The augmented reality device disclosed herein is further described above. The augmented reality device may be implemented in any suitable instructor device 204 disclosed in the entirety of this disclosure. As a non-limiting example, the instructor device 204 may include an augmented reality in a mobile phone of an instructor personal device. As another non-limiting example, the instructor device 204 may include an augmented reality in a smart watch of the instructor personal device. The augmented reality device may alternatively or additionally be implemented using a display, which may display user image data, instructor image data, instructor feedback, and the like. skilled in the art, upon reviewing the entirety of this disclosure, will be aware of various optical projection and/or display technologies that may be incorporated in augmented reality device consistently with this disclosure. In an embodiment, the augmented reality device of the instructor device 204 may display a user avatar to an instructor 236. In another embodiment, the augmented reality device of the instructor device 204 may display a third-party avatar to the instructor 236. In another embodiment, the augmented reality device of the instructor device 204 may display an instructor avatar to instructor 236.

Still referring to FIG. 2, in some cases, user/instructor/third-party avatar may be registered, by processor 120, to a view feed. As used herein, "registration" of an avatar or any other visual elements to a view feed means identifying a location within the view feed of each pixel of each visual element or virtual avatar. Registration may be done with respect to a field coordinate system. As used herein, a "field coordinate system," is a coordinate system of a view feed, such as a Cartesian coordinate system a polar coordinate system, or the like. Registration of a frame to a view feed may be characterized as a map associating each pixel of a frame, and/or coordinates thereof in a frame coordinate system, to a pixel of field coordinate system. Such mapping may result in a two-dimensional projection of corresponding three-dimensional coordinates on one or more two-dimensional images. For example, registration of a 2D visual element may be done by identifying a region of a field coordinate system that matches the dimensions of the visual element and displaying the visual element in that region (such as when a visual element is intended to be displayed relative to a user's field of view regardless of user movement). As another example, registration of a 3D element may be done by rendering the 3D element as voxels, taking a projection of the voxels on the field coordinate system, and displaying the projection (such as when display of a 3D visual element is desired). As another example, registration of an avatar or a visual element may be done by rendering the avatar or the visual element in a location relative to an object, taking a projection of the avatar on a field coordinate system, and displaying the projection (such as when rendering text describing instructions to an example yoga pose beside the virtual avatar iteratively performing the example yoga pose is desired). In some embodiments, registration of an avatar or a visual element may change from frame to frame. For example, if display of a rotating 3D visual element is desired, then a projection of the avatar or the visual element may differ from frame to frame, such as due to a change in the perspective of a user relative to the rotating element. As another example, display of an avatar or a visual element may change if the avatar or the visual element is displayed relative to an object, and a user/user avatar moves relative to the object.

Continuing with reference to FIG. 2, in a further non-limiting embodiment, processor 120 may be configured to overlay desired form for a user on a video feed, e.g., user action data containing video clip of user's body. In some cases, desired form may be included in one or more supplementary videos generated based on user action data using one or more generative machine learning models described above. In a non-limiting example, such overlay may include a stick figure, avatar, dummy image, or other visual representation that illustrates the proper alignment or posture for a particular yoga pose or movement. In some cases, overlay may also be scaled and adapted to specific user; for instance, and without limitation, processor 120 may take into account data describing one or more attributes of individual user e.g., height, body proportions, gender, or any other relevant factors. In an embodiment, scaling of the overlay may be achieved through one or more computer vision techniques, anthropometric modeling, and/or machine learning algorithms. In a non-limiting example, processor 120 may be configured to generate a customized overlay that aligns with user's unique physique using a deep neural network as described in further detail below with reference to FIGS. 5A-5B, trained using training data containing a plurality of body measurements, postures, and/or alignments as input correlated to a plurality of desired pose representations as output. In another non-limiting example, processor 120 may utilize skeletal tracking and geometric transformation algorithms to adapt the overlay to the user's specific body proportions and movements. In some cases, processor 120 may be configured to identify a plurality of key anatomical landmarks such as, without limitations, joints, spine alignment, and/or the like, and map the plurality of key anatomical landmarks to a standardized model such as, without limitation, a stick figure or avatar. Mapped model may then be scaled and transformed to match user's actual dimensions and pose, ensuring that the overlay provides an accurate and intuitive visual guide. Additionally, or alternatively, gender-specific adjustments, biomechanical constraints, and other individualized factors may be incorporated into the scaling process, further enhancing the overlay's relevance and effectiveness Further, overlay may be registered to view feed using similar field coordinate system as described above to ensure the generated visual representation maintains its spatial relationships with users' body as they move. In some cases, overlay may be animated or dynamically adjusted to guide user through a sequence of poses and provide real-time feedback and correction, In a non-limiting example, if a user's alignment deviates from the movement template, the overlay may change color, flash, vibrate or provide other visual cues to signal the error.

With continued reference to FIG. 2, in some embodiments, an instructor device 204 may be configured to receive a user query from a user 108. As a non-limiting example, the user query may be received from a US equipment 208. As another non-limiting example, the user query may be received from a user device 120. As another non-limiting example, the user query may be received from a query device. The query device disclosed herein is further described above. In some embodiments, the instructor device 204 display the user query to an instructor 236. The user query disclosed herein is further described above. In some embodiments, the user query may be displayed on the instructor device 204. As a non-limiting example, the user query may be displayed on a display of an instructor output device 240 of the instructor device 204. As another non-limiting example, the user query may be displayed on an audio device of the instructor output device 240 of the instructor device 204. In some embodiments, the user query may be displayed as a text, audio, video, image, icon, flashing light, visual effect, and the like. As a non-limiting example, the user query may be displayed by a flashing light around user image data displayed on the display of the instructor output device 240 of the instructor device 204. As another non-limiting example, the user query may be displayed by an icon displayed on the user image data displayed on the display of the instructor output device 240 of the instructor device 204. As another non-limiting example, the user query may be displayed using an audio device of the instructor output device 240 of the instructor device 204. As another non-limiting example, the user query may be displayed as a text on the user image data displayed on the display of the instructor output device 240 of the instructor device 204. As another non-limiting example, the user query may be displayed by zooming a user 108 on the user image data displayed on the display of the instructor output device 240 of the instructor device 204. In some embodiments, the instructor 236 may provide an instructor feedback according to the user query.

With continued reference to FIG. 2, in some embodiments, a fitness classroom 104 may include a user sign-in device. For the purposes of this disclosure, a "user sign-in device" is a device that allow a user to access a fitness class. In some embodiments, a user 108 may use a unique identifier to access a fitness class. For the purposes of this disclosure, a "unique identifier" is an identifier that is unique for an object among others. As a non-limiting example, the unique identifier may include a universal product code (barcode), radio-frequency identification (RFID,) identification card, personal identification number (PIN,) cryptographic hashes, primary key, a unique sequencing of alphanumeric symbols, or anything of the like that can be used to identify the user 108. For the purposes of this disclosure, a "universal product code" is a method of representing data in a visual, machine-readable form. In an embodiment, the universal product code may include linear barcode. For the purposes of this disclosure, "linear barcode," also called "one-dimensional barcode" is a barcode that is made up of lines and spaces of various widths or sizes that create specific patterns. In another embodiment, the universal product code may include matrix barcode. For the purposes of this disclosure, "matrix barcode," also called "two-dimensional barcode" is a barcode that is made up of two dimensional ways to represent information. As a non-limiting example, the matrix barcode may include quick response (QR) code, and the like. In some embodiments, the user sign-in device may allow the user 108 to take the fitness class when the user 108 uses any data that is useful in biometrically identifying the user 108, including but not limited to fingerprints, retina scans, genetic material data, physical appearance, voice recognition, or any other data useful in identifying an individual. Unique identifier may take the form of any identifier that uniquely corresponds to the purposes of a fitness classroom assembly 100; this may be accomplished using methods including but not limited to Globally Unique Identifiers (GUIDs), Universally Unique Identifiers (UUIDs), or by maintaining a data structure, table, or database listing all transmitter identifiers and checking the data structure, table listing, or database to ensure that a new identifier is not a duplicate. In an embodiment, the unique identifier may be used to keep track of the user 108. As a non-limiting example, the unique identifier may track a number of times the user 108 has taken the fitness class. As another non-limiting example, the unique identifier may track a number of times the user 108 has gotten instructor feedbacks. In another embodiment, the unique identifier may be used to identify the user 108 from other users 108. In an embodiment, the unique identifier may include a printed form. As another non-limiting example, the user 108 may have a printed unique identifier on a paper. In another embodiment, the unique identifier may include a digital form. As a non-limiting example, the user 108 may find the unique identifier on a phone screen, tablet, computer screen, or any display device thereof. As a non-limiting example, the user 108 may find the unique identifier on a phone screen.

With continue reference to FIG. 2, for the purposes of this disclosure, a "scanning device" is a device for scanning a unique identifier. In some embodiments, the scanning device may include an illumination system, a sensor, and a decoder. The sensor in the scanning device may detect the reflected light from the illumination system and may generate an analog signal that is sent to the decoder. The decoder may interpret that signal, validate the unique identifier using the check digit, and convert it into text. This converted text may be delivered by the scanning device to a computing device holding a database of any information of a fitness class. As a non-limiting example, the scanning device may include a pen-type reader, laser scanner, camera-based reader, CCD reader, omni-directional barcode scanner, and the like. In some embodiments, the scanning device may include wired or wireless communication.

With continued reference to FIG. 2, in some embodiments, a user sign-in device may check information of a fitness class that a user 108 may take as the user 108 sign into the user sign-in device using a unique identifier. The user sign-in device may identify which fitness class the user 108 booked to take from information obtained from the unique identifier the user 108 used to sign in with the user sign-in device. As a non-limiting example, if a fitness class that is on a fitness classroom 104 and the information from the unique identifier of the user 108 corresponds, the user sign-in device may allow the user 108 to take the fitness class and/or get into the fitness classroom. As another non-limiting example, if the fitness class that is on the fitness classroom 104 and the information from the unique identifier of the user 108 corresponds, the user sign-in device may assign a user smart equipment 208 to the user 108. As another non-limiting example, if a fitness class that is on a fitness classroom 104 and the information from the unique identifier of the user 108 corresponds, the user sign-in device may assign a first display 112 of a plurality of first displays 112 in the fitness classroom 104 to the user 108. As another non-limiting example, if the fitness class that is on the fitness classroom 104 and the information from the unique identifier does not correspond, the user sign-in device may not allow the user 108 to take the fitness class and/or get into the fitness classroom.

With continued reference to FIG. 2, in some embodiments, a fitness classroom 104 may include a temperature control system. For the purposes of this disclosure, a "tem-perature control system" is a system that is configured to maintain a temperature of a space at a certain temperature. In some embodiments, the temperature control system may be configured to change a temperature of the fitness classroom 104. As a non-limiting example, the temperature control system may heat the fitness classroom 104. As another non-limiting example, the temperature control system may cool the fitness classroom 104. In an embodiment, the temperature control system may be controlled by a user 108. As a non-limiting example, the user 108 may manually push a button the temperature control system to change the temperature of the fitness classroom 104. In another embodiment, the temperature control system may be controlled by an instructor 120. As a non-limiting example, the instructor 236 may manually push the button of the temperature control system to change the temperature of the fitness classroom 104. As another non-limiting example, the instructor 236 may transmit a temperature request to change the temperature of the fitness classroom 104. For the purposes of this disclosure, a "temperature request" is a request from an instructor for changing a temperature of a space. In some embodiments, the instructor 236 may transmit the temperature request remotely by maneuvering an instructor device 204. The instructor device 204 disclosed herein is further described above. As a non-limiting example, the instructor 236 may use an instructor personal device such as without limitation a mobile phone to change the temperature of the fitness classroom 104. In some embodiments, the temperature control system may be connected with a network interface device to the instructor device 204.

With continued reference to FIG. 2, a fitness classroom assembly 100 may include a fitness database. For the purposes of this disclosure, "fitness database" is a data structure configured to store and manage data associated a configuration of a fitness class. In one or more embodiments, the fitness database may include inputted datum related to a user 108 and an instructor 236. A datum history may be stored in the fitness database. The datum history may include real-time and/or previous inputted data related to the user 108 or the instructor 236 such as but not limited to user action data, user image data, instructor action data, instructor image data, and the like. A computing device may be communicatively connected with the fitness database. For example, and without limitation, in some cases, the fitness database may be local to the computing device. In another example, and without limitation, the fitness database may be remote to the computing device and communicative with the computing device by way of one or more networks. A network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure computing device connect directly, dynamically, and non-hierarchically to as many other computing devices as possible. A "network topology" as used in this disclosure is an arrangement of elements of a communication network. Network may use an immutable sequential listing to securely store the fitness database. An "immutable sequential listing," as used in this disclosure, is a data structure that places data entries in a fixed sequential arrangement, such as a temporal sequence of entries and/or blocks thereof, where the sequential arrangement, once established, cannot be altered, or reordered. An immutable sequential listing may be, include and/or implement an immutable ledger, where data entries that have been posted to the immutable sequential listing cannot be altered.

With continued reference to FIG. 2, in some embodiments, a fitness database may include keywords. As used in this disclosure, a "keyword" is an element of word or syntax used to identify and/or match elements to each other. For example, without limitation, the keyword may be "force data" in the instance that a user 108 is looking for data related to a force during a fitness class. In another non-limiting example, a keyword may be "feedback" in an example the user 108 is looking for a feedback from an instructor 236. In another non-limiting example, a keyword may be "body measurement" in an example the instructor 236 is looking for a body measurement of the user 108.

With continued reference to FIG. 2, in some embodiments, a fitness database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Figures 3A, 3B, 3C:
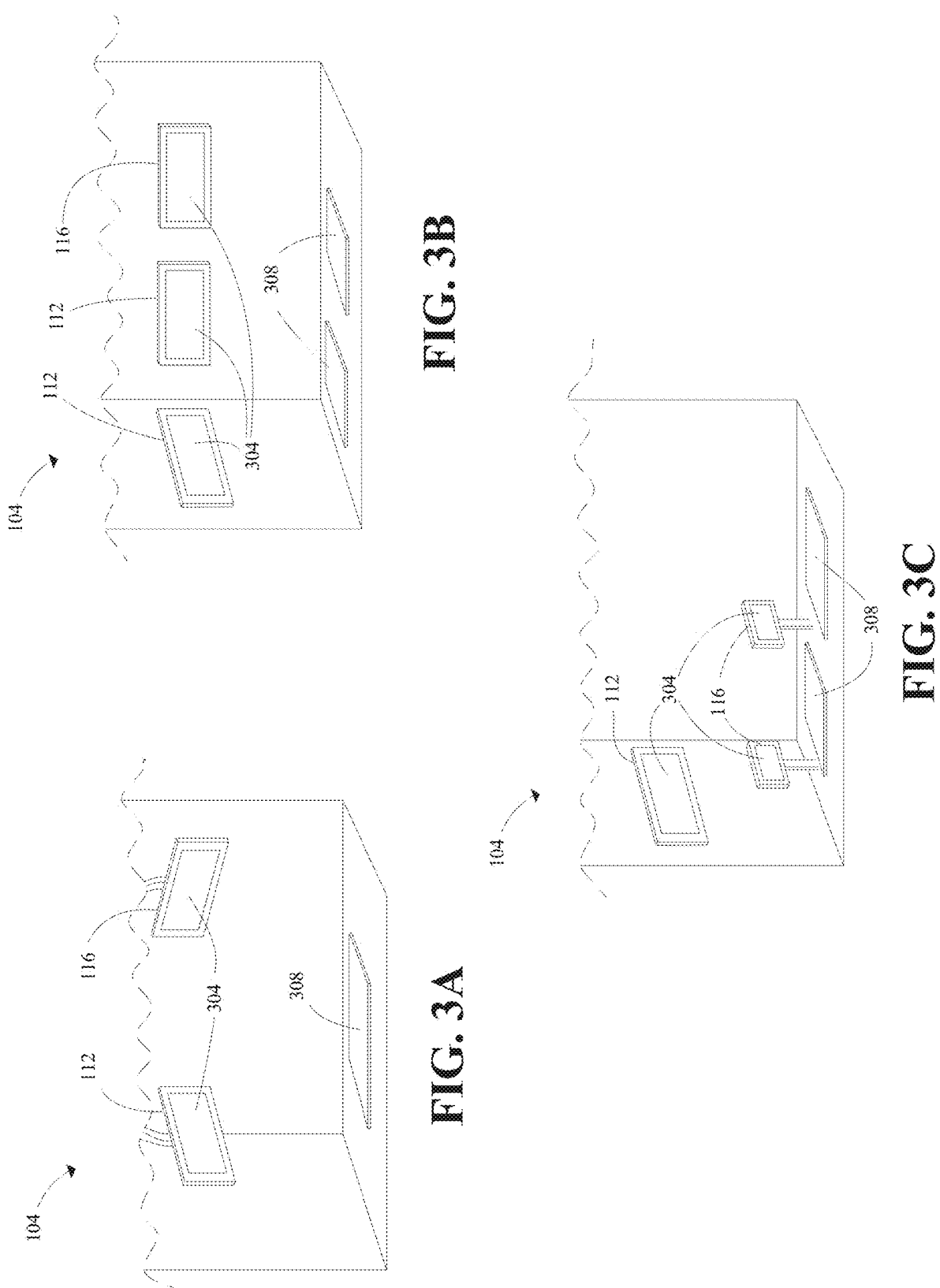
FIG. 3A-C are exemplary embodiments of a fitness classroom of a fitness classroom assembly.

Referring now to FIG. 3A-C, exemplary embodiments of a fitness classroom 104 is illustrated. In some embodiments, the fitness classroom 104 may include a first display 112. As a non-limiting example, the first display 112 may include a monitor 304, a headset, a mobile phone, a tablet, a laptop, and the like. In some embodiments, the first display 112 may include a plurality of first displays 112. The plurality of first displays 112 may provide instructor image data with multiple angles of an instructor 236. The plurality of first displays 112 may provide different fitness classes to a user 108. The plurality of first displays 112 may provide different fitness classes to one or more users 108. The first display 112 may include a user camera 228. The plurality of first displays 112, where each of the plurality of first displays 112 includes the user camera 228, may provide user image data with multiple angles of the user 108. The user camera 228 may include a plurality of user camera 228. In some embodiments, the fitness classroom 104 may include user smart equipment 208. As a non-limiting example, the user smart equipment 208 may include a smart mat 308, wearable device, and the like. In some embodiments, the user smart equipment 208 may include a plurality of the user smart equipment 208.

With continued reference to FIG. 3A, in some embodiments, a first display 112 may be on a ceiling of a fitness classroom 104 overhead of a user 108. In some embodiments, a second display 116 may be on the ceiling of the fitness classroom 104 overhead of a user 108. The first display 112 and the second display 116 may include a monitor 304. In some embodiments, the fitness room 104 may include a smart mat 308 of a US equipment 208. The smart mat 308 disclosed herein may be consistent with a smart mat disclosed with respect to FIG. 2.

With continued reference to FIG. 3B, in some embodiments, a first display 112 may be on a wall of a fitness classroom 104. In some embodiments, a second display 116 may be on the wall of the fitness classroom 104. The first display 112 and the second display 116 may include a monitor 304. In some embodiments, the first display 112 may include a plurality of first displays 112. In some embodiments, the fitness room 104 may include a smart mat 308 of a US equipment 208. In some embodiments, the fitness room 104 may include a plurality of US equipment 208 including but not limited to the smart mat 308. In some embodiments, when a user 108 signs into the fitness classroom 104 by scanning a unique identifier using a user sign-in device, the user sign-in device may assign the user 108 to one of the plurality of US equipment 208 including but not limited to the smart mat 308. The unique identifier and the user sign-in device disclosed herein are further described with respect to FIG. 2.

With continued reference to FIG. 3C, in some embodiments, a first display 112 may be on a wall of a fitness classroom 104. In some embodiments, a second display 116 may be on a floor of the fitness classroom 104. The first display 112 and the second display 116 may include a monitor 304. In some embodiments, the second display 116 may include a plurality of second displays 116. In some embodiments, the fitness room 104 may include a smart mat 308 of a US equipment 208. In some embodiments, the fitness room 104 may include a plurality of US equipment 208 including but not limited to the smart mat 308. In an embodiment, when a user 108 signs into the fitness classroom 104 by scanning a unique identifier using a user sign-in device, the user sign-in device may assign the user 108 to one of the plurality of US equipment 208 including but not limited to the smart mat 308. In another embodiment, when the user 108 signs into the fitness classroom 104 by scanning the unique identifier using the user sign-in device, the user sign-in device may assign the user 108 to one of the plurality of second displays 116. The unique identifier and the user sign-in device disclosed herein are further described with respect to FIG. 2.

Figure 4:
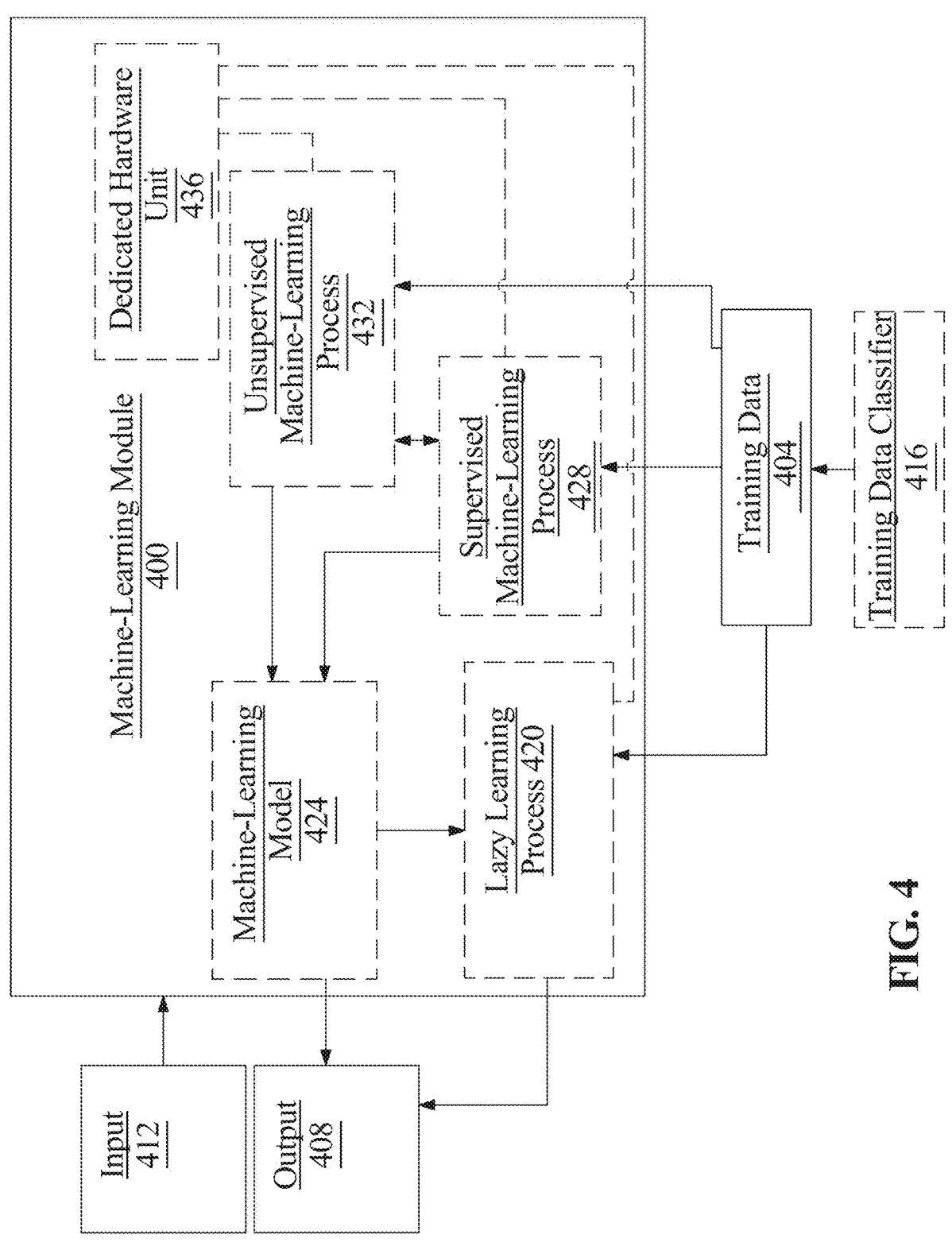
FIG. 4 is a block diagram of exemplary embodiment of a machine learning module.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm instantiated in hardware or software logic, data structures, and/or functions that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example, training data may include a plurality of video clips of one or more users as input correlated to a plurality of instruction texts or even supplementary videos containing information describing, evaluating, or correcting the performance of one or more poses as output.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to a sub-population, such as difficulty level of yoga poses within class data.

With further reference to FIG. 4, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 4, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 4, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 4, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 4, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include user action data as described above as inputs, class data and/or instructor feedbacks as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

With further reference to FIG. 4, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 4, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 432 may not require a response variable; unsupervised processes 432 may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 4, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 4, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 4, one or more processes or algorithms described above may be performed by at least a dedicated hardware unit 436. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 436 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 436 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 5A:
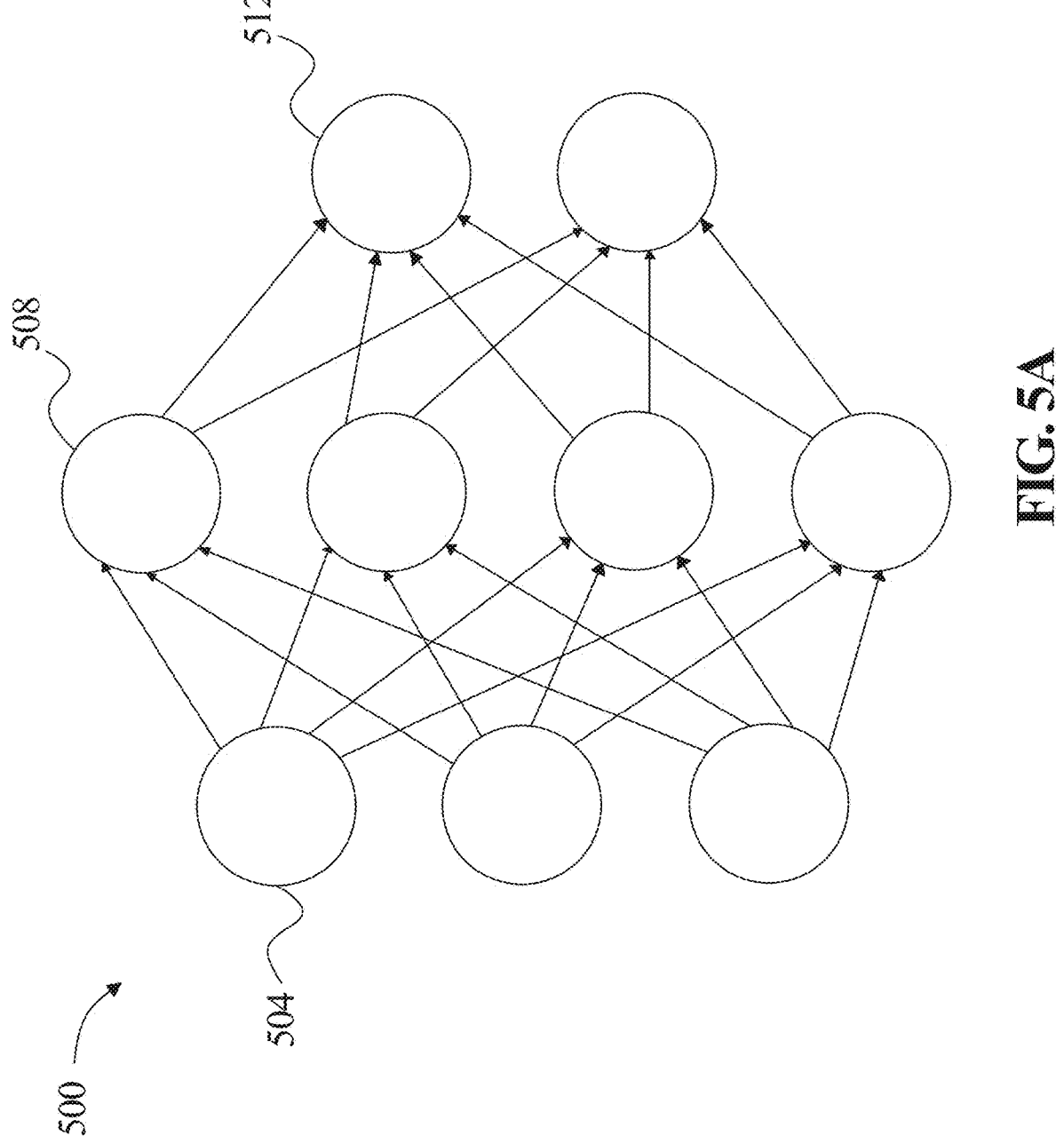
FIG. 5A is a diagram of an exemplary neural network.

Referring now to FIG. 5A, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

With continued reference to FIG. 5A, in an embodiment, neural network may include a deep neural network (DNN). As used in this disclosure, a "deep neural network" is defined as a neural network with two or more hidden layers. In a non-limiting example, neural network may include a convolutional neural network (CNN). Generating class data, instructor data/feedback, or any other data described above may include training CNN using training data such as any training data described above with reference to FIGS. 2 and 4, and generating class data and/or instructor data/feedback using trained CNN. A "convolutional neural network," for the purpose of this disclosure, is a neural network in which at least one hidden layer is a convolutional layer that convolves inputs to that layer with a subset of inputs known as a "kernel," along with one or more additional layers such as pooling layers, fully connected layers, and the like. In some cases, CNN may include, without limitation, a deep neural network (DNN) extension. Mathematical (or convolution) operations performed in the convolutional layer may include convolution of two or more functions, where the kernel may be applied to input data e.g., frames of given video clips through a sliding window approach. In some cases, convolution operations may enable processor 104 to detect local/global patterns, edges, textures, and any other features described herein within each frames. Features may be passed through one or more activation functions, such as without limitation, Rectified Linear Unit (ReLU), to introduce non-linearities into the data generation process.

Additionally, or alternatively, and still referring to FIG. 5A, CNN may also include one or more pooling layers, wherein each pooling layer is configured to reduce the dimensionality of input data while preserving essential features within the input data. In a non-limiting example, CNN may include one or more pooling layer configured to reduce the dimensions of feature maps by applying downsampling, such as max-pooling or average pooling, to small, non-overlapping regions of one or more features. "Downsampling," also known as decimation, may include removing every Nth entry in a sequence of samples, all but every Nth entry, or the like. In an embodiment, downsampling is a compression process performed by an N-sample compressor implemented using hardware or software. In some cases, anti-aliasing and/or anti-imaging filters, and/or low-pass filters, may be used to cleanup side-effects of downsampling. In some cases, downsampling may reduce the computational complexity of the network, improve its generalization capabilities, and provide a form of translation invariance.

Still referring to FIG. 5A, CNN may further include one or more fully connected layers configured to combine features extracted by the convolutional and pooling layers as described above. In some cases, one or more fully connected layers may allow for higher-level pattern recognition. In a non-limiting example, one or more fully connected layers may connect every neuron (i.e., node) in its input to every neuron in its output, functioning as a traditional feedforward neural network layer. In some cases, one or more fully connected layers may be used at the end of CNN to perform high-level reasoning and produce the final output such as, without limitation, class data such as yoga poses examples. Further, each fully connected layer may be followed by one or more dropout layers configured to prevent overfitting, and one or more normalization layers to stabilize the learning process described herein.

Figure 5B:
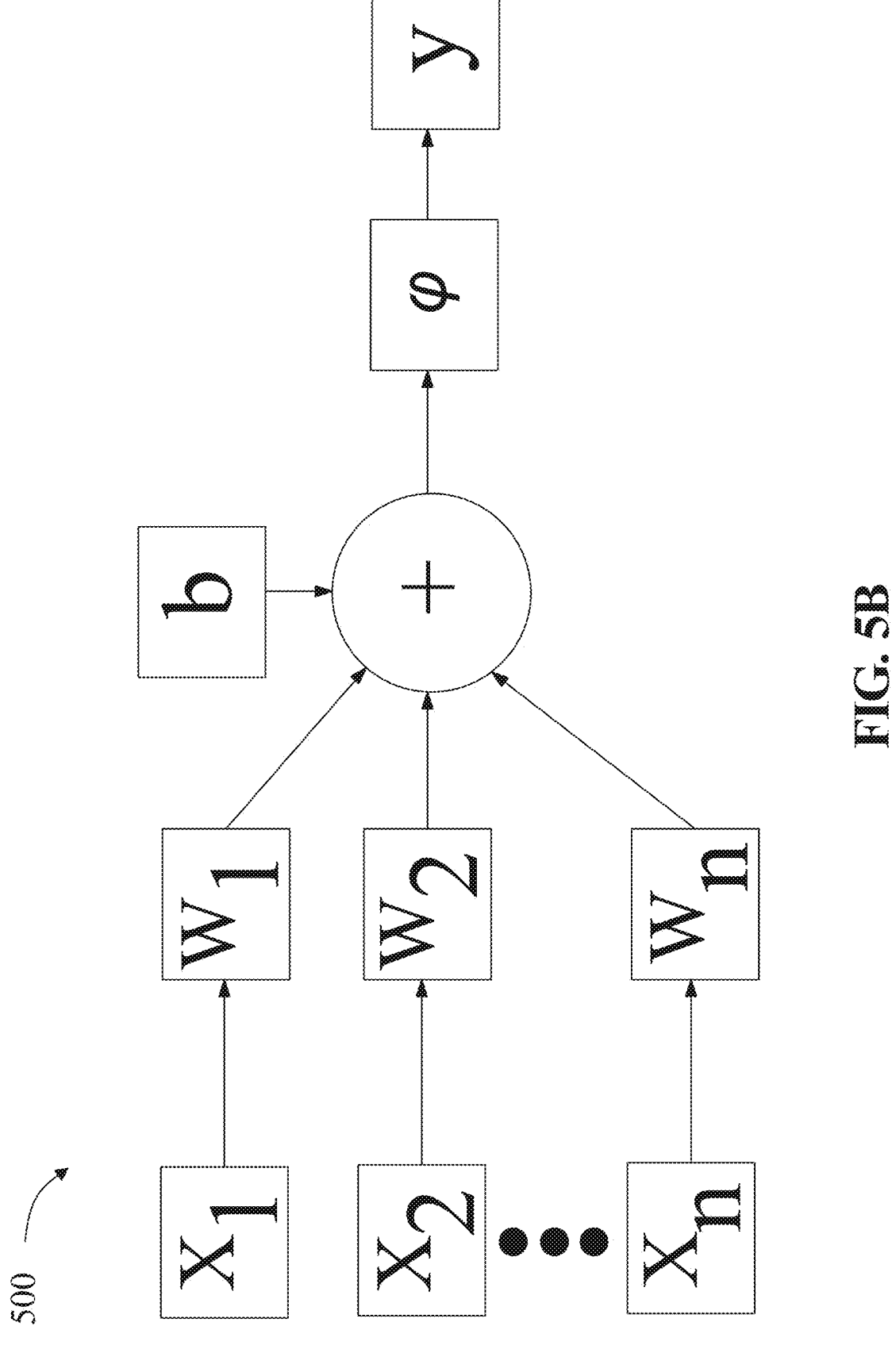
FIG. 5B is a block diagram of an exemplary node.

Referring now to FIG. 5B, an exemplary embodiment of a node of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $$f(x) = \tanh^2(x),$$

a rectified linear unit function such as $f(x) = \max(0,x)$, a "leaky" and/or "parametric" rectified linear unit function such as $f(x) = \max(ax,x)$ for some a, an exponential linear units function such as $$f(x) = \begin{cases} x & \text{for } x \geq 0 \\ \alpha(e^x - 1) & \text{for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x) = x^*\text{sigmoid}(x)$, a Gaussian error linear unit function such as $$f(x) = a\left(1 + \tanh\left(\sqrt{2/\pi}\,(x + bx^r)\right)\right)$$

for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Referring now to FIG. 6, a flow diagram of an exemplary method 600 of a use of a fitness classroom assembly is disclosed. The method 600 includes a step 605 of receiving, using at least a processor, primary class content data, wherein the primary class content data includes primary video display data. This may be implemented as described and with reference to FIGS. 1-5 and 7.

With continued reference to FIG. 6, a method 600 includes a step 610 of receiving, using the at least a processor, secondary class content data, wherein the secondary class content data includes secondary video display data. In some embodiments, the secondary class content data may further include an instructor feedback. In some embodiments, the instructor feedback may include instructor action data. This may be implemented as described and with reference to FIGS. 1-5 and 7.

With continued reference to FIG. 6, a method 600 includes a step 615 of displaying, using the at least a processor, the primary video display data on a first display of a fitness classroom to a user. In some embodiments, the first display may include a plurality of first displays. In some embodiments, the first display may include an augmented reality (AR) device. The method 600 may further include displaying, using the AR device of the first display, a third-party avatar to the user. In some embodiments, the first display may include a virtual reality (VR) device. The method 600 may further include displaying, using the VR device of the first display, an instructor avatar to the user. This may be implemented as described and with reference to FIGS. 1-5 and 7.

With continued reference to FIG. 6, a method 600 includes a step 620 of displaying, using the at least a processor, the secondary video display data on a second display of the fitness classroom to the user. In some embodiments, the fitness classroom further comprises a user camera, wherein the user camera may further be configured to detect user image data. In some embodiments, the primary video display data may include instructor image data. The method 600 may further include generating, using the at least a processor, an analytic feedback as a function of the user image data and the instructor image data and displaying, using the at least a processor, the analytic feedback on the second display to the user. In some embodiments, the fitness classroom may further include user smart equipment, wherein the user smart equipment may be configured to detect user action data. The method 600 may further include displaying, using the at least a processor, the user action data on the second display to the user. In some embodiments, the user smart equipment may further include an indicator, wherein the indicator may be configured to display the secondary class content data to the user. The method 600 may further include displaying, using the at least a proces- sor, instructor action data of an instructor feedback on the second display. In some embodiments, the fitness classroom may further include a user sign-in device, wherein the user sign-in device may be configured to assign one first display of a plurality of first displays to the user. This may be implemented as described and with reference to FIGS. 1-5 and 7.

Referring now to FIG. 7, a flow diagram of an exemplary method 700 of a use of a fitness classroom assembly is disclosed. The method 700 includes a step 705 of transmit- ting, using an instructor device, class data to a user device of a fitness classroom, wherein the class data includes a plurality of images of an instructor. The method 700 includes a step 710 of displaying, using the user device of the fitness classroom, the class data to a user. The method 700 includes a step 715 of receiving, using an instructor device, user image data from a user camera of the fitness classroom, wherein the image data comprises a plurality of images of the user. The method 700 includes a step 720 of receiving, using the instructor device, user action data from at least a user equipment sensor of a user smart equipment of the virtual in-person fitness classroom. The method 700 includes a step 725 of displaying, using the instructor device, the image data to an instructor. The method 700 includes a step 730 of displaying, using the instructor device, the user action data to the instructor. The method 700 includes a step 735 of receiving, using the instructor device, an instructor feedback from the instructor. The method 700 includes a step 740 of transmitting, using the instructor device, the instructor feedback to the user device. The method 700 includes a step 745 of displaying, using the user device of the fitness classroom, the instructor feedback to the user. The method 700 may further include generating, using the user device, an analytic feedback as a function of the image data and the class data and displaying, using the user device, the analytic feedback to the user. The method 700 may further include displaying, using the user smart equip- ment, the analytic feedback to the user. The method 700 may further include detecting, using an instructor camera of the instructor device, the plurality of images of the instructor of the class data. The method 700 may further include detect- ing, using at least an instructor equipment sensor feedback of an instructor smart equipment of the instructor device, instructor action data. The method 700 may further include receiving, using the user smart equipment, instructor action data of the instructor feedback from the at least an instructor equipment sensor of the instructor smart equipment of the instructor device and displaying, using the user smart equip- ment, the instructor action data of the instructor feedback to the user. The method 700 may further include displaying, using an indicator of the user smart equipment, the instructor action data of the instructor feedback to the user. The method 700 may further include displaying, using an augmented (AR) device of the instructor device, a user avatar to the instructor as a function of the user image data. The method 700 may further include displaying, using a virtual reality (VR) device of the user device, a third-party avatar to the user. In some embodiments, the fitness classroom may further include a user sign-in device, wherein the user sign-in device may be configured to assign the user smart equipment to the user. In some embodiments, the fitness classroom may include a one-person classroom. In some embodiments, the user smart equipment may include a wearable device. In some embodiments, the user smart equipment may include a smart mat. In some embodiments, the fitness classroom may further include a temperature control system, wherein the temperature control system may be configured to control a temperature of the fitness class- room as a function of a temperature request. In some embodiments, the method 700 may further include display- ing, using the instructor device, the analytic feedback to the instructor. In some embodiments, the user smart equipment may further include an indicator, wherein the indicator may be configured to display the instructor action data of the instructor feedback to the user. In some embodiments, the class data comprises the class feedback and the indicator of the user smart equipment may be further configured to display the class feedback of the class data to the user. In some embodiments, the indicator of the user smart equip- ment may include a light indicator. In some embodiments, the indicator of the user smart equipment may further include a pressure indicator. In some embodiments, the method 700 may further include receiving, using the instruc- tor device, a user query from the user and displaying, using the instructor device, the user query to the instructor. This may be implemented as described and with reference to FIG. 1-6.

It is to be noted that any one or more of the aspects and embodiments described herein may be conveniently imple- mented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the imple- mentation of the machine executable instructions of the software and/or software module.

Such software may be a computer program product that employs a machine-readable storage medium. A machine- readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
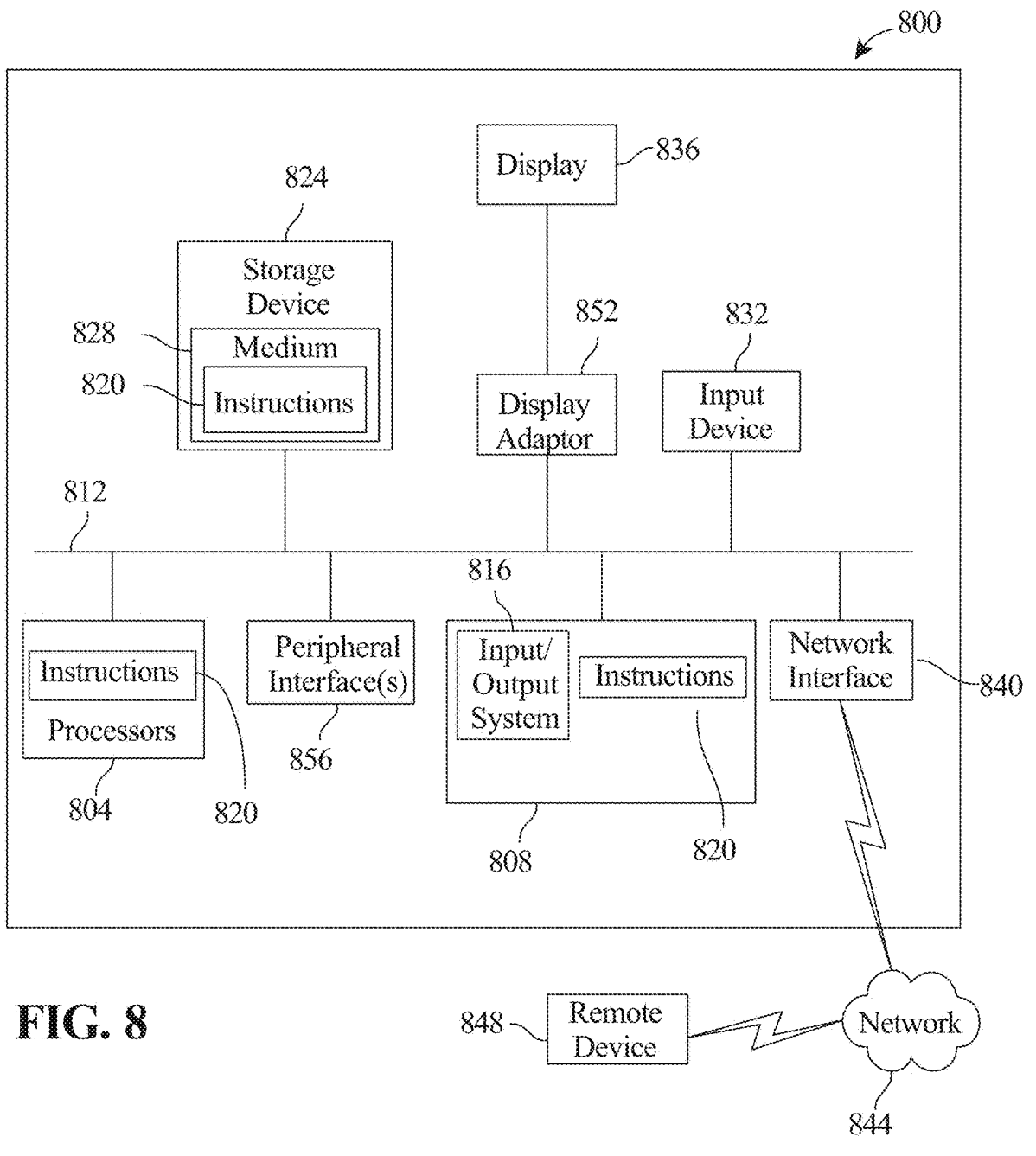
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIRE-WIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention. Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A fitness classroom assembly, wherein the assembly comprises:
a fitness classroom, wherein the fitness classroom comprises:
a first display; and
a second display;
at least a processor communicatively connected to the first display and the second display; and
a memory communicatively connected to the at least processor, the memory containing instructions configuring the at least processor to:

receive primary class content data, wherein the primary class content data comprises primary video display data;
receive secondary class content data, wherein the secondary class content data comprises secondary video display data;
display the primary video display data on the first display to a user;
display the secondary video display data on the second display to the user;
detect a plurality of deficiencies of a movement of the user, wherein detecting the plurality of deficiencies comprises comparing the movement of the user to a predefined movement;
generate, iteratively, by a generative adversarial network (GAN), a supplementary video based on the plurality of deficiencies to demonstrate suggested modifications to the movement of the user, wherein generating the supplementary video comprises:
synchronizing the supplementary video with the movement of the user in real-time;
evaluating an alignment between the supplementary video and the movement of the user to generate feedback;
identifying one or more incorrectly performed poses of the user as a function of the plurality of deficiencies; and
updating the GAN as a function of the feedback and the one or more incorrectly performed poses; and
display the supplementary video to the user, wherein:
the supplementary video comprises a voice-over guidance and visual pose indicators generated by the GAN; and
the supplementary video continuously provides guidance to the user with suggested modifications to the movement of the user in real-time.

2. The fitness classroom assembly of claim 1, wherein:
the first display comprises a plurality of first displays; and
the fitness classroom further comprises a user sign-in device, wherein the user sign-in device is configured to assign one first display of the plurality of first displays to the user.

3. The fitness classroom assembly of claim 1, wherein the fitness classroom further comprises a user camera, wherein the user camera is further configured to detect user image data.

4. The fitness classroom assembly of claim 2, wherein:
the primary video display data comprises instructor image data; and
the memory includes the instructions further configuring the at least a processor to:
generate an analytic feedback as a function of user image data and the instructor image data; and
display the analytic feedback on the second display to the user.

5. The fitness classroom assembly of claim 1, wherein:
the fitness classroom further comprises user smart equipment, wherein the user smart equipment is configured to detect user action data; and
the memory includes the instructions further configuring the at least a processor to display the user action data on the second display to the user.

6. The fitness classroom assembly of claim 5, wherein the user smart equipment further comprises an indicator, wherein the indicator is configured to display the secondary class content data to the user.

7. The fitness classroom assembly of claim 6, wherein the secondary class content data further comprises an instructor feedback.

8. The fitness classroom assembly of claim 7, wherein:

the instructor feedback comprises instructor action data; and the memory includes the instructions further configuring the at least a processor to display the instructor action data of the instructor feedback on the second display.

9. The fitness classroom assembly of claim 1, wherein:

the first display comprises an augmented reality (AR) device; and the AR device of the first display is further configured to display a third-party avatar to the user.

10. The fitness classroom assembly of claim 1, wherein:

the first display comprises a virtual reality (VR) device; and the VR device of the first display is further configured to display an instructor avatar to the user.

11. The fitness classroom assembly of claim 1, wherein detecting the plurality of deficiencies further comprises:

receiving, from at least one sensor communicatively connected to the at least a processor, one or more electrical signals as a function of user action data;

processing the one or more electrical signals to generate the movement of the user; and comparing the movement of the user to a predefined movement to determine the plurality of deficiencies of the movement of the user.

12. A method of using a fitness classroom assembly, wherein the method comprises:

receiving, using at least a processor, primary class content data, wherein the primary class content data comprises primary video display data;

receiving, using the at least a processor, secondary class content data, wherein the secondary class content data comprises secondary video display data;

displaying, using the at least a processor, the primary video display data on a first display of a fitness classroom to a user;

displaying, using the at least a processor, the secondary video display data on a second display of the fitness classroom to the user;

detecting, using the at least a processor, a plurality of deficiencies of a movement of the user, wherein detecting the plurality of deficiencies comprises comparing the movement of the user to a predefined movement;

generating, iteratively, by a generative adversarial network (GAN), a supplementary video based on the plurality of deficiencies to demonstrate suggested modifications to the movement of the user, using one of, wherein generating the supplementary video comprises:

synchronizing the supplementary video with the movement of the user in real-time;

evaluating an alignment between the supplementary video and the movement of the user to generate feedback;

identifying one or more incorrectly performed poses of the user as a function of the plurality of deficiencies; and updating the GAN as a function of the feedback and the one or more incorrectly performed poses; and displaying, using the at least a processor, the supplementary video to the user, wherein:

the supplementary video comprises a voice-over guidance and visual pose indicators generated by the GAN; and the supplementary video continuously provides guidance to the user with suggested modifications to the movement of the user in real-time.

13. The method of claim 12, wherein:

the first display comprises a plurality of first displays; and the fitness classroom further comprises a user sign-in device, wherein the user sign-in device is configured to assign one first display of the plurality of first displays to the user.

14. The method of claim 12, wherein the fitness classroom further comprises a user camera, wherein the user camera is further configured to detect user image data.

15. The method of claim 13, wherein the primary video display data comprises instructor image data and further comprising:

generating, using the at least a processor, an analytic feedback as a function of user image data and the instructor image data; and displaying, using the at least a processor, the analytic feedback on the second display to the user.

16. The method of claim 12, wherein the fitness classroom further comprises user smart equipment, wherein the user smart equipment is configured to detect user action data and further comprising:

displaying, using the at least a processor, the user action data on the second display to the user.

17. The method of claim 16, wherein the user smart equipment further comprises an indicator, wherein the indicator is configured to display the secondary class content data to the user.

18. The method of claim 17, wherein the secondary class content data further comprises an instructor feedback.

19. The method of claim 18, wherein the instructor feedback comprises instructor action data and further comprising:

displaying, using the at least a processor, the instructor action data of the instructor feedback on the second display.

20. The method of claim 12, wherein the first display comprises an augmented reality (AR) device and further comprising:

displaying, using the AR device of the first display, a third-party avatar to the user.

21. The method of claim 12, wherein the first display comprises a virtual reality (VR) device and further comprising:

displaying, using the VR device of the first display, an instructor avatar to the user.

22. The method of claim 12, wherein detecting the plurality of deficiencies further comprises:

receiving, from at least one sensor communicatively connected to the at least a processor, one or more electrical signals as a function of user action data;

processing the one or more electrical signals to generate the movement of the user; and comparing the movement of the user to a predefined movement to determine the plurality of deficiencies of the movement of the user.

* * * * *